(12) United States Patent
Titcomb

(10) Patent No.: US 6,315,452 B1
(45) Date of Patent: Nov. 13, 2001

(54) ZERO STATIC-FRICTION ACTUATOR PIVOT BEARING FOR PRODUCTION DISK DRIVES

(76) Inventor: Forrest D. Titcomb, 4035 Sleeping Indian La., Colorado Springs, CO (US) 80904

( * ) Notice: Subject to any disclaimer, the term of this patent is extended or adjusted under 35 U.S.C. 154(b) by 0 days.

(21) Appl. No.: 09/560,520

(22) Filed: Apr. 28, 2000

(51) Int. Cl.[7] ............ F16C 32/06; H02K 5/16; H02K 7/08; H02K 5/24; G11B 5/012
(52) U.S. Cl. .............. 384/114; 310/90; 310/51; 360/86; 360/97.01; 384/100; 384/107; 384/132
(58) Field of Search .................... 384/100, 107, 384/108, 109, 110, 111, 112, 113, 114, 115, 118, 119, 120, 121, 123, 124, 132; 310/90, 51; 360/86, 97.01

(56) References Cited

U.S. PATENT DOCUMENTS

| 5,328,270 | 7/1994 | Crawford et al. | 384/100 |
|---|---|---|---|
| 5,516,212 | 5/1996 | Titcomb | 384/107 |
| 5,642,943 | 7/1997 | Szeremeta | 384/100 |
| 5,666,242 | 9/1997 | Edwards et al. | 360/106 |
| 5,952,752 | * 9/1999 | Kim | 310/90 |
| 6,020,664 | * 2/2000 | Liu et al. | 310/90 |
| 6,036,413 | * 3/2000 | Chandrasekar | 409/231 |
| 6,079,879 | * 6/2000 | Takahashi | 384/119 |

* cited by examiner

Primary Examiner—Thomas R. Hannon
Assistant Examiner—Timothy McAnulty
(74) Attorney, Agent, or Firm—Michael H. Jester

(57) ABSTRACT

A hydrostatic bearing assembly, with an integral rotating-shaft hydrodynamic pump, adapted for use as a stiff zero static-friction actuator pivot bearing for the head-stack assembly of a disk drive data storage apparatus. The zero static-friction pivot bearing avoids all "limit cycling" and "sticking" problems arising from static bearing friction during micro-tracking operations. The motor-driven hydrodynamic pumping element is disposed coaxially to the zero static-friction hydrostatic bearing element in a single assembly adapted for use as an actuator pivot bearing. The hydrodynamic pumping element and the hydrostatic bearing element both use a plurality of spaced-apart radial journal-bearing layers and a plurality of axial thrust-bearing layers to provide stiffness in all directions at any rotational velocity. The lubricating fluid pressure within the hydrodynamic pumping element is controlled on both sides of every bearing layer by coupling all radial journal-bearing layers and axial thrust-bearing layers to a circumferential undercut (or overcut) and by coupling these circumferential undercuts to ambient pressure through a plurality of fluid-filled passages in the several rotating and stationary elements. The fluid bearing layers are coupled to form a continuous pressure-controlled fluid film sealed at three ends by surface tension. In an actuator pivot bearing for a disk drive data storage apparatus, the hydrodynamic pump motor can be operated under the control of a dual phase-locked motor drive controller to synchronize it with a spindle motor element in a manner that cancels vibrations arising from both motors.

18 Claims, 16 Drawing Sheets

ZERO STATIC-FRICTION ACTUATOR PIVOT BEARING FOR PRODUCTION DISK DRIVES

BACKGROUND OF THE INVENTION

1. Field of the Invention

This invention relates generally to hydrostatic bearings adapted for use in the head-actuator assembly of a rotating disk data store and more specifically to a zero static-friction rotating-sleeve hydrostatic bearing assembly with an integral rotating-shaft hydrodynamic pump having opposing thrust-bearing axial hydrodynamic pumping action.

2. Description of the Related Art

Continuing advances in computer data storage technology strongly motivate improvements in magnetic disk areal storage densities. Increased data storage densities require corresponding increases in sensor-to-disk positioning precision. The typical magnetic disk data store includes several magnetic disks spinning at high speed while suspended on a common spindle bearing assembly, which includes a spinning bearing sleeve supported by a stationary bearing journal. Typically in the art, sensing heads are positioned to read or write streams of data from or to concentric tracks on each of the spinning magnetic disk surfaces. The precise radial position of each sensing head is controlled by a head actuator assembly that rotates on an actuator pivot bearing responsive to an actuator positioning motor, which operates to move each head from one track to another.

As the disk spindle bearing journal and bearing sleeve spin relative to one another, a point on the spin axis may trace out a path or orbit. The wobbling motion of this spin axis includes synchronous and asynchronous components, referred to in the art as repetitive "runout" and non-repetitive "runout," respectively. Hydrodynamic spindle bearing designs are preferred in the disk drive art over the older ball-bearing spindle systems because the rolling elements in ball-bearing spindle systems produce relatively large non-repetitive runout arising from several causes, including imperfect race and ball geometries, surface defects, non-axisymmetric radial stiffness, misalignments and imbalances. Modern servo tracking systems can compensate for most of the effects of repetitive spindle bearing runout. Uncompensated spindle bearing runout limits the available data storage density, which can be improved only by reducing and/or improving compensation for any spindle bearing assembly runout.

The track width and lineal data density determines the overall areal storage capacity of the disk surface. Any non-repetitive (e.g., vibration-induced) wobble in either the high-speed spindle bearing or the intermittently-rotating actuator pivot bearing affects the precise location of microscopic data storage sites on the disk surface with respect to the data sensing head. The available sensor-to-data repositioning precision imposes an upper limit on the overall areal storage capacity of the disk surface. Accordingly, vibration effects must be reduced in both the disk spindle bearing and the actuator pivot bearing to permit improved magnetic disk areal storage densities.

The actuator pivot bearing is also subject to "limit cycling" and "sticking" problems arising from the non-zero static bearing friction. Every time the actuator assembly is repositioned, the actuator motor must first overcome the pivot bearing static friction to begin the move and then halt the actuator assembly motion at precisely the desired position. For very small movements, such as those needed to follow a slightly-eccentric servo track (while compensating for repetitive spindle runout), the actuator first sticks because of static friction and then overshoots because of the sudden drop in friction occurring upon movement, and finally settles on track only after an unwanted delay. When commanded to move very slightly, the actuator may simply "stick" and not move at all. This imposes a lower limit on the available precision of any actuator movement and thereby prevents the precise tracking of servo-tracks with small eccentricities. The static friction of the actuator pivot bearing must be reduced to permit more refined actuator repositioning (such as required to better compensate for the effects of repetitive spindle bearing runout).

The disk drive art is replete with improvements in hydrodynamic spindle bearings for supporting disk rotational velocities of 10,000 RPM and more. For instance, a gas bearing is one well-known way of supporting a rapidly rotating shaft for some applications. Gas bearings may use either hydrostatic or hydrodynamic principles of operation. In a hydrostatic gas bearing, pressurized gas is supplied from an external source into the space between a rotating shaft and its surrounding sleeve. The gas acts as a lubricant and allows the shaft to rotate without coming into contact with the sleeve. In a hydrodynamic bearing, oblique grooves are cut in a shaft and the rotation of the shaft causes gas to flow through the grooves. The dynamic pressure created by this gas flow allows the gas to act as a lubricant during high-speed rotation of the shaft, thereby avoiding the need for an external mechanical compressor; such compressors are often undesirable because they occupy space within the device, consume power, and are a source of unwanted vibration and contamination.

In U.S. Pat. No. 5,328,270, Roy Crawford et al. disclose an integrated spindle bearing and pump assembly that includes a hydrodynamic pump disposed coaxially with respect to a hydrodynamic bearing. The integrated assembly provides pressurized fluid from one hydrodynamic bearing for use within the other hydrodynamic bearing. The pump bearing design is optimized for high flow pumping applications rather than the high pressure, zero flow requirements of the second support bearing, thereby optimizing the support bearing design without the need for an external compressor.

In U.S. Pat. No. 5,516,212, Forrest Titcomb discloses a spinning-shaft hydrodynamic spindle bearing having two or more radial and at least two axial thrust bearing layers with several improvements to control lubricating fluid pressure distribution to ensure balanced hydrostatic pressure throughout the entire bearing assembly in all of the several fluid bearing layers to prevent cavitation and lubricant blowout.

The hydrodynamic bearing that is so useful for spindle applications cannot be used to support head actuator assembly rotation because the actuator rotates back and forth intermittently over a small sector of perhaps less than sixty degrees and cannot sustain the continuous pumping action needed for a hydrodynamic bearing. Even so, in applications requiring very high precision (such as in factory servowriting machines) the hydrostatic gas bearing (with external gas compressor) has long been used to support head actuator assembly rotation. For instance, in U.S. Pat. No. 5,642,943, Wally Szeremeta discloses a self-aligning hydrostatic gas bearing particularly useful for supporting a distal end of an extended rotary apparatus in a system for the wholesale writing of servopatterns to the disk surfaces within a plurality of aligned head-disk assemblies. Such hydrostatic gas bearings are not suitable for use in production disk drive assemblies because of their size, weight, cost and the requirement for an external source of compressed gas.

Many practitioners in the disk drive art have proposed other improvements in head actuator pivot bearings intended to improve the precision of head-track positioning. For instance, in U.S. Pat. No. 5,666,242, John Edwards et al. disclose a pivot bearing assembly with an elastomeric interface disposed between the stationary member and the actuator to dampen any vibratory motion imparted to the head stack assembly. As illustrated by Edwards, et al., the usual practice is to use a ball-bearing assembly or a sealed journal bearing assembly together with various means for eliminating the transfer of shock and vibration to the head stack. Even so, the usual actuator pivot bearing assembly is a source of limit cycling, stickiness and external vibration transfer effects that limit available track-positioning precision, which burdens the servo tracking system and enforces an unwanted lower limit on track seek time.

It is desirable to resolve this problem by providing a useful hydrostatic bearing to support head actuator rotation. Until now, this has not been possible because of the well-known limitations discussed above. These unresolved problems and deficiencies are clearly felt in the art and are solved by this invention in the manner described below.

SUMMARY OF THE INVENTION

This invention arises from the unexpectedly advantageous observation that a hydrodynamic pump can be integrated with a hydrostatic bearing by coupling the fluid bearing layers to ensure balanced hydrostatic pressure throughout the entire bearing assembly in all of the several fluid bearing layers.

It is a purpose of this invention to provide a zero static-friction hydrostatic actuator pivot bearing for disk drive assemblies with an integral fluid pressure pump. It is a feature of this invention that the hydrodynamic pumping element is disposed within the hydrostatic bearing element in a single assembly adapted for use as a zero static-friction actuator pivot bearing. It is an advantage of this invention that it provides a zero static-friction hydrostatic pivot bearing without external pumping apparatus.

It is another purpose of this invention to provide a hydrostatic bearing having improved stiffness to reduce repetitive runout. It is another feature of this invention that lubricating fluid pressure is controlled on both sides of every bearing element by coupling all radial journal-bearing layers and axial thrust-bearing layers to a circumferential undercut (or overcut) and by coupling these circumferential undercuts to ambient pressure through a plurality of fluid-filled passages in the rotating shaft. It is another advantage of this invention that the fluid pressure equalization in combination with a liquid lubricating fluid provides improved bearing axial and radial stiffness, thereby reducing repetitive runout, which is desirable for other applications that do not incorporate servo-tracking features to compensate for repetitive runout in the bearings.

It is yet another purpose and advantage of this invention that it is scalable, requires relatively few components and is relatively easy to manufacture.

In one aspect, the invention is a hydrostatic bearing assembly for supporting rotation about a bearing axis, the assembly including a fixed shaft having outer and inner surfaces disposed about the bearing axis; a quantity of lubricating fluid disposed on the inner and outer fixed-shaft surfaces; a rotatable pump shaft having an outer surface including a pump-shaft pumping surface disposed within the inner fixed-shaft surface to form therebetween a fluid-pumping layer of the lubricating fluid and a pump-shaft bearing surface disposed within the inner fixed-shaft surface to form therebetween a pump journal-bearing layer of the lubricating fluid and two pump thrust-bearing layers of the lubricating fluid; a rotatable bearing sleeve having an inner surface disposed about the outer fixed-shaft surface to form therebetween a sleeve journal-bearing layer of the lubricating fluid and two sleeve thrust-bearing layers of the lubricating fluid; a plurality of fluid-filled passages within each of the fixed shaft, the pump shaft and the bearing sleeve to communicate fluid pressure between the fluid-pumping layer and the plurality of pump and sleeve journal-bearing and thrust-bearing layers; and a tapered surface to form a fluid capillary seal at each of two ends of the bearing sleeve and at one end of the pump shaft for retaining the lubricating fluid within the bearing assembly.

It is another purpose of this invention to reduce the effects of the unwanted mechanical vibration arising in a disk drive apparatus from the disk transport mechanism spindle motor for rotating the data storage disk on a spindle bearing. It is a feature and advantage of this invention that the rotatable pump shaft is driven by a pivot bearing motor that may be operated in synchronization with the spindle motor in a disk drive apparatus to cancel much of the unwanted mechanical vibrations arriving at the actuator assembly from the disk transport mechanism.

Another aspect of the invention is a disk drive apparatus for storing data, the disk drive apparatus including a base; a disk assembly having at least one rotatable data storage disk with at least one surface adapted for storage of data thereon; a disk transport mechanism coupled to the rotatable data storage disk and including a spindle motor for selectively imparting rotational motion to the data storage disk and for generating a first mechanical vibration in the disk drive apparatus; a head stack assembly for reading and writing data on the disk assembly; and a hydrostatic pivot bearing assembly for rotatably coupling the head stack assembly to the base about a bearing axis, the pivot bearing assembly including a fixed shaft having outer and inner surfaces disposed about the bearing axis, a quantity of lubricating fluid disposed on the inner and outer fixed-shaft surfaces, a rotatable pump shaft having an outer surface including a pump-shaft pumping surface disposed within the inner fixed-shaft surface to form therebetween a fluid-pumping layer of the lubricating fluid and a pump-shaft bearing surface disposed within the inner fixed-shaft surface to form therebetween a pump journal-bearing layer of the lubricating fluid and two pump thrust-bearing layers of the lubricating fluid, a rotatable bearing sleeve having an inner surface disposed about the outer fixed-shaft surface to form therebetween a sleeve journal-bearing layer of the lubricating fluid and two sleeve thrust-bearing layers of the lubricating fluid, a plurality of fluid-filled passages within each of the fixed shaft, the pump shaft and the bearing sleeve to communicate fluid pressure between the fluid-pumping layer and the plurality of pump and sleeve journal-bearing and thrust-bearing layers, and a tapered surface to form a fluid capillary seal at each of two ends of the bearing sleeve and at one end of the pump shaft for retaining the lubricating fluid within the bearing assembly; a pivot bearing motor for rotating the rotatable pump shaft and for generating a second mechanical vibration in the disk drive apparatus; and a motor controller having circuit means for controlling the speed and phase of the spindle motor rotation and for controlling the speed and phase of the pivot bearing motor rotation.

The foregoing, together with other features and advantages of this invention, can be better appreciated with reference to the following specification, claims and the accompanying drawings.

BRIEF DESCRIPTION OF THE DRAWINGS

For a more complete understanding of this invention, reference is now made to the following detailed description of the embodiments illustrated in the accompanying drawings, wherein.

DETAILED DESCRIPTION OF THE PREFERRED EMBODIMENTS

Figure 1:
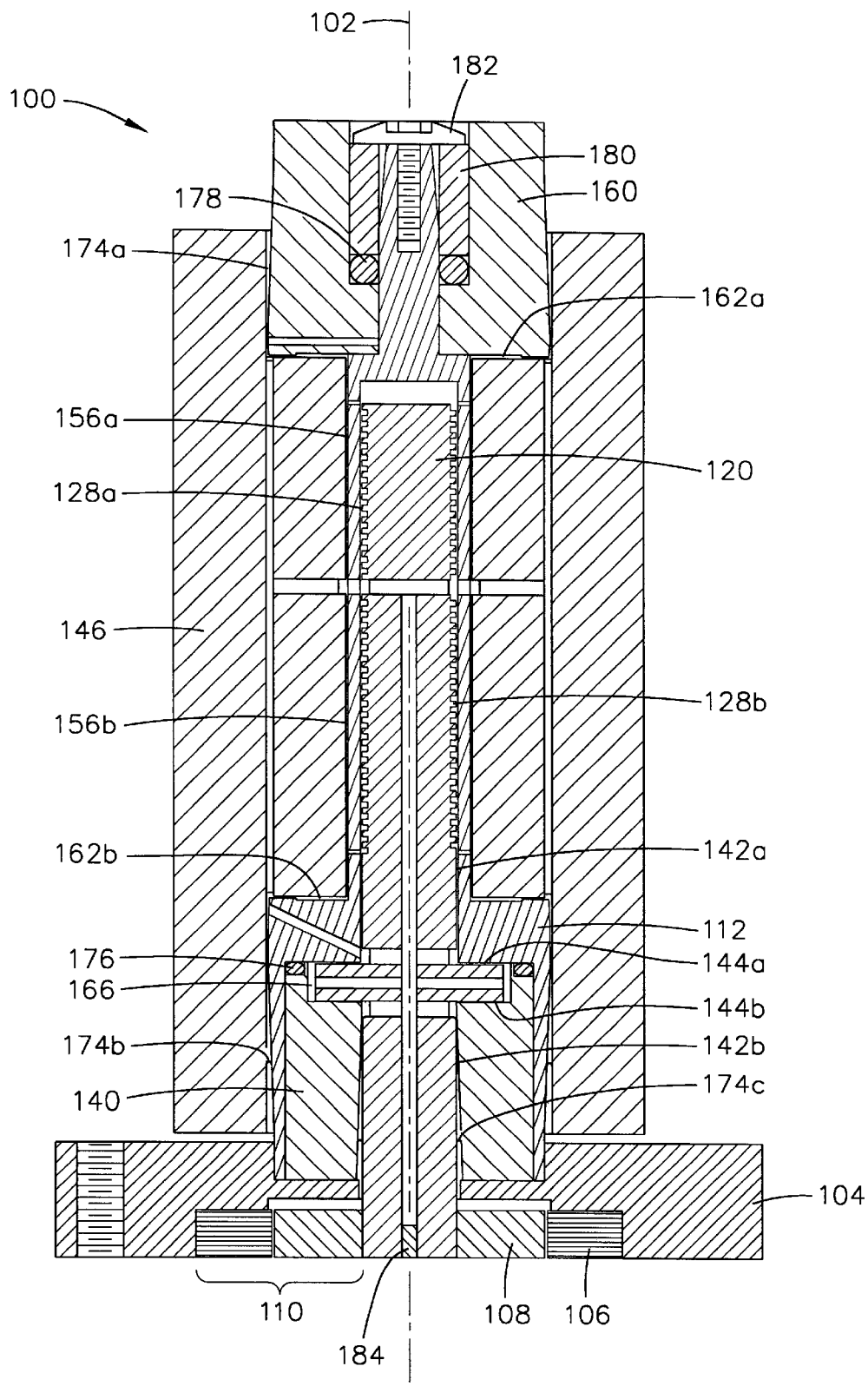
FIG. 1 shows a cross-sectional view of a preferred embodiment of the hydrostatic bearing assembly of this invention wherein the pumping and bearing elements are disposed concentrically.

FIG. 1 shows a cross-sectional view of a preferred embodiment of the hydrostatic bearing assembly 100 of this invention wherein the hydrodynamic pumping element and the hydrostatic bearing element are both disposed concentrically about the same bearing axis 102. Assembly 100 is supported on a mounting flange 104, which also supports a laminated field coil 106. Field coil 106, in combination with a rotatable permanent magnet element 108, forms a hydrodynamic pump motor 110, which can be powered and controlled in any useful manner, such as is discussed in more detail hereinbelow.

Figure 2A:
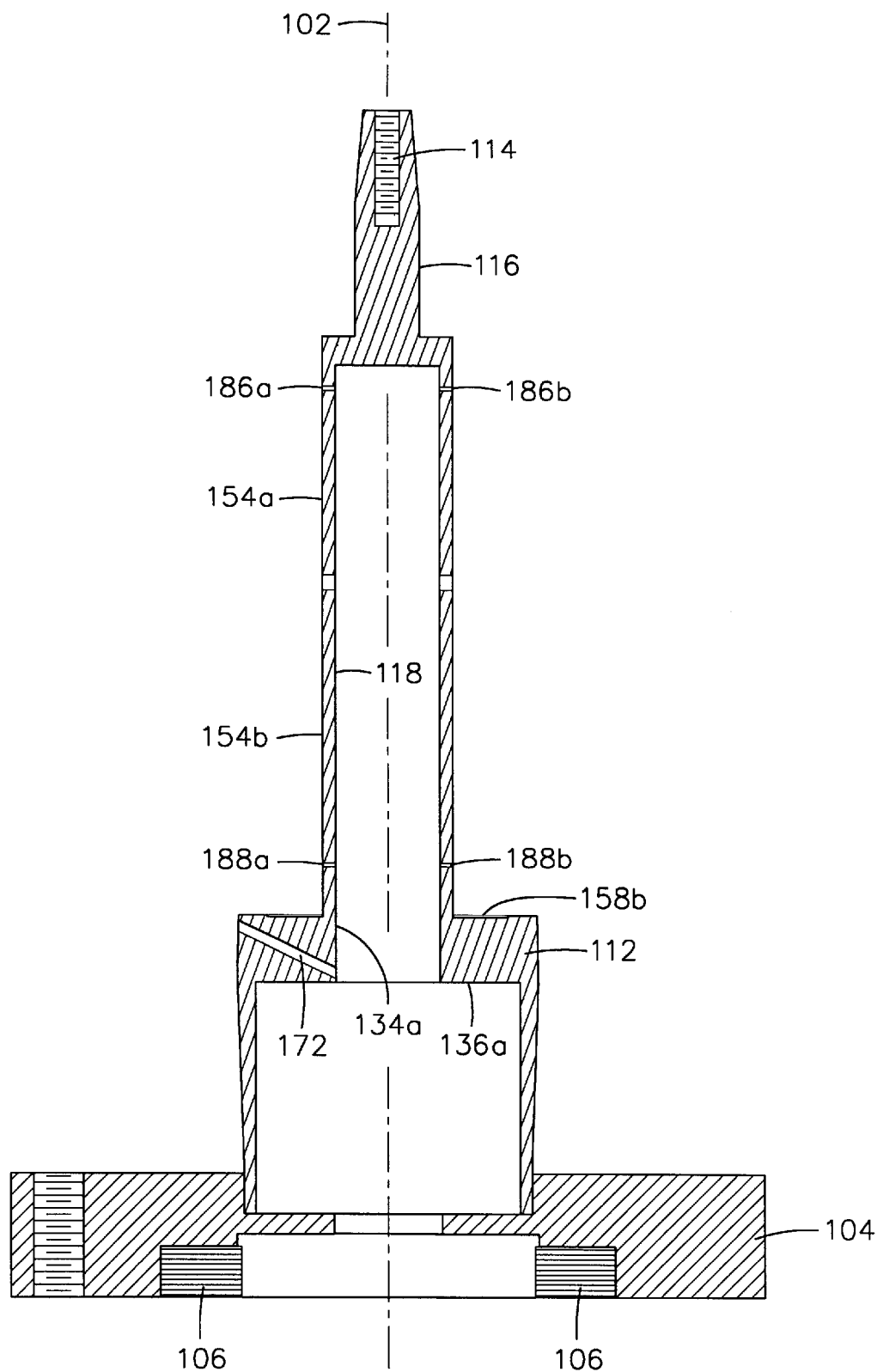
FIGS. 2A–2E show cross-sectional views of selected mechanical elements of the hydrostatic bearing assembly from FIG. 1.
Figure 2B:
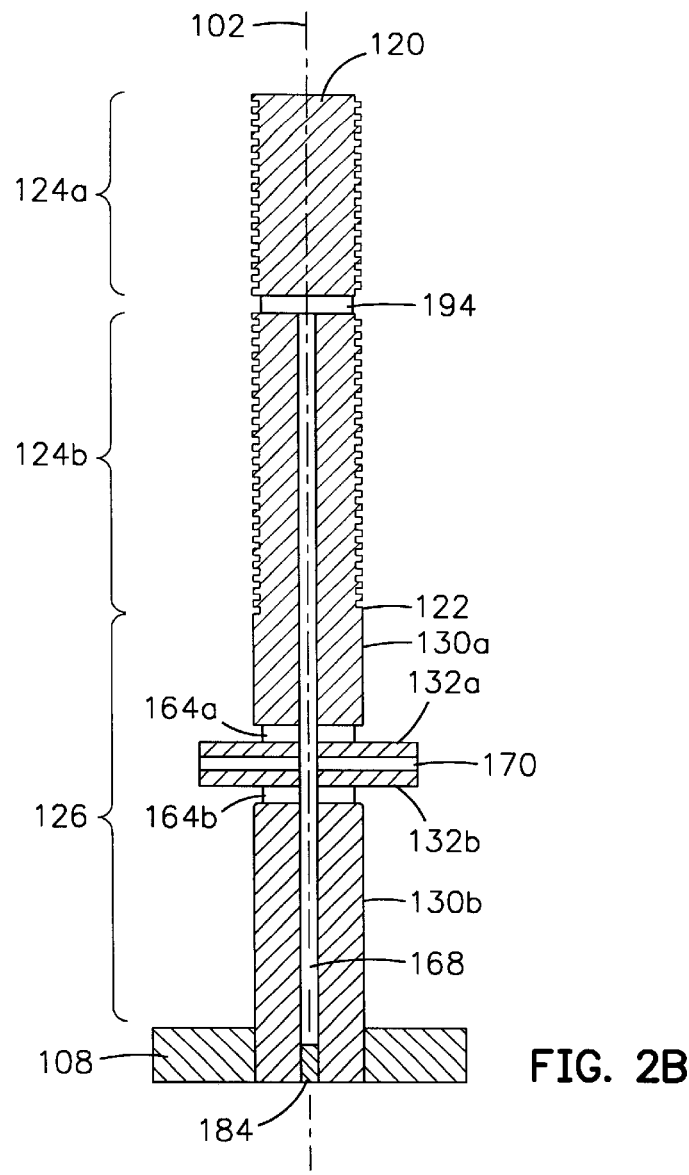
Figure 2C:
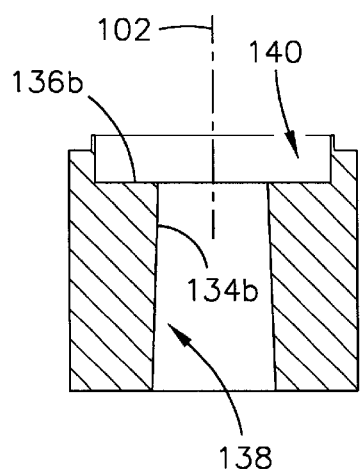
Figure 2E:
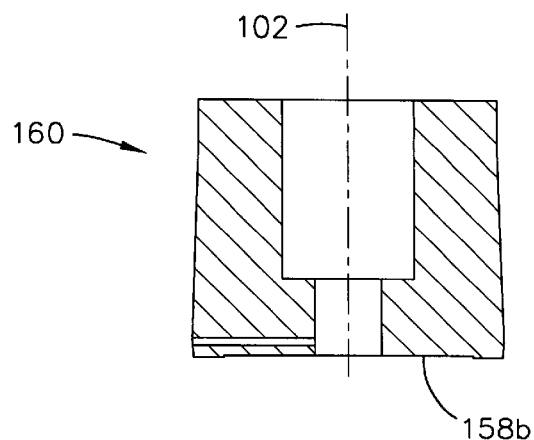

FIGS. 2A–2E show cross-sectional views of selected mechanical elements of the hydrostatic bearing assembly from FIG. 1 isolated from assembly 100 to assist with the clarity of description. FIG. 2A shows a cross-sectional view of the fixed shaft 112, the lower end of which is fixed (in any useful manner such as epoxy, shrink-fit, etc.) to mounting flange 104 substantially as shown. The upper end of fixed shaft 112 is adapted to receive a cap screw in the threaded bore 114. Fixed shaft 112 has an outer surface 116 and an inner surface 118, both of which are disposed symmetrically about axis 102 substantially as shown. FIG. 2B shows a cross-sectional view of the rotatable pump shaft 120, which is fixed (in any useful manner such as epoxy, shrink-fit, etc.) to permanent magnet element 108 substantially as shown. Rotatable pump shaft 120 has an outer pump-shaft surface 122, the upper portion of which includes the upper and lower helical-groove pumping surfaces 124a–b and the lower portion of which includes a stepped bearing surface 126 forming a thrust plate. When rotatable pump shaft 120 is disposed within fixed shaft 112, helical-grooved pumping surfaces 124a–b cooperate with inner fixed-shaft surface 118 to form therebetween the upper and lower fluid-pumping layers 128a–b (FIG. 1), which are filled with a quantity of lubricating fluid and are each substantially cylindrical extending axially along axis 102. In a preferred embodiment, fluid-pumping layer 128a operates to move lubricating fluid in an upward direction and fluid-pumping layer 128b operates to move lubricating fluid in a downward direction, as described hereinbelow in connection with FIG. 3. The purpose of fluid-pumping layers 128a–b is to provide a source of hydrostatic fluid pressure that circulates lubricating fluid under pressure throughout the hydrostatic pivot bearing element of this invention. The detailed operation of fluid-pumping layers 128a–b is discussed hereinbelow.

Referring to FIG. 2B, stepped bearing surface 126 includes the upper and lower cylindrical surfaces 130a–b, which cooperate respectively with the mating portions 134a–b of inner fixed-shaft surface 118 (FIG. 2A) to form therebetween the two pump journal-bearing layers 142a–b (FIG. 1). Stepped bearing surface 126 also includes the thrust plate defining the upper and lower radial surfaces 132a–b, which cooperate respectively with the mating portion 136a of inner fixed-shaft surface 118 (FIG. 2A) and the mating portion 136b of the inner surface 138 of the lower fixed-shaft insert 140 (FIG. 2C) to form therebetween the two pump thrust-bearing layers 144a–b (FIG. 1). Pump journal-bearing layers 142a–b and pump thrust-bearing layers 144a–b are filled with a quantity of lubricating fluid to hydrodynamically support the nearly frictionless rotation of rotatable pump shaft 120 within inner fixed-shaft surface 118 in the manner described at length in the above-cited hydrodynamic spindle bearing patent (Titcomb U.S. Pat. No. 5,516,212). Pump journal-bearing layers 142a–b are substantially cylindrical extending axially along axis 102. Pump thrust-bearing layers 144a–b are substantially annular extending radially normal to axis 102.

When rotatable pump shaft 120 is rotated at full speed by hydrodynamic pump motor 110, the hydrodynamic fluid pressure in pump journal-bearing layers 142*a–b* supports rotatable pump shaft 120 in stiff and nearly frictionless radial alignment with inner fixed-shaft surface 118 and the hydrodynamic fluid pressure in pump thrust-bearing layers 144*a–b* supports rotatable pump shaft 120 in stiff and nearly frictionless axial alignment with inner fixed-shaft surface 118, in the manner well-known in the art for hydrodynamic spindle bearing assemblies.

Figure 2D:
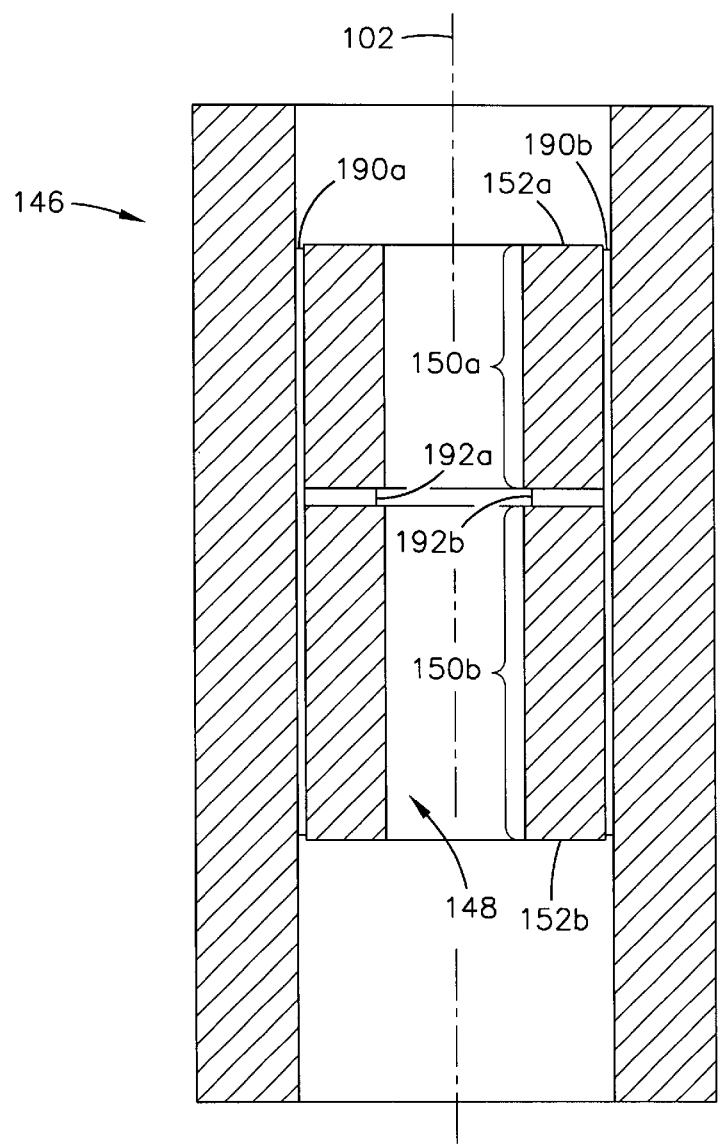

FIG. 2D shows a cross-sectional view of the rotatable bearing sleeve 146, which has an inner stepped surface 148 disposed symmetrically about axis 102 substantially as shown. Inner bearing-sleeve surface 148 includes the upper and lower central cylindrical surfaces 150*a–b*, and the upper and lower annular surfaces 152*a–b*. As shown in FIG. 1, the central cylindrical inner bearing-sleeve surfaces 150*a–b* (FIG. 2D) cooperate respectively with the mating portions 154*a–b* of outer fixed-shaft surface 116 (FIG. 2A) to form therebetween the upper and lower sleeve-journal bearing layers 156*a–b* (FIG. 1), which are filled with a quantity of lubricating fluid to hydrostatically support the nearly frictionless rotation of bearing sleeve 146 in radial alignment with inner fixed-shaft surface 118. As can be readily appreciated by skilled practitioners, bearing sleeve 146 is subject to zero static-friction and to a small dynamic friction that is substantially proportional to the effective lubricating fluid viscosity and the rotational velocity of bearing sleeve 146. Likewise, upper and lower annular surfaces 152*a–b* (FIG. 2D) cooperate respectively with the mating portion 158*a* of outer fixed-shaft surface 116 (FIG. 2A) and the mating portion 158*b* of the upper fixed shaft cap 160 (FIG. 2E) to form therebetween the two sleeve thrust-bearing layers 162*a–b* (FIG. 1), which are filled with a quantity of lubricating fluid to hydrostatically support the nearly frictionless rotation of rotatable bearing sleeve 146 in axial alignment with inner fixed-shaft surface 118. Sleeve journal-bearing layers 156*a–b* are substantially cylindrical extending axially along axis 102. Sleeve thrust-bearing layers 162*a–b* are substantially annular extending radially normal to axis 102.

When rotatable pump shaft 120 is rotated at full speed by hydrodynamic pump motor 110, the hydrostatic fluid pressure from fluid-pumping layers 128*a–b* is conveyed to sleeve journal-bearing layers 156*a–b* to support rotatable bearing sleeve 146 in stiff and nearly frictionless radial alignment with inner fixed-shaft surface 118, The hydrostatic fluid pressure from fluid-pumping layers 128*a–b* is also conveyed to sleeve thrust-bearing layers 162*a–b* to support rotatable bearing sleeve 146 in stiff and nearly frictionless axial alignment with inner fixed-shaft surface 118, in the manner described hereinbelow.

Figure 3:
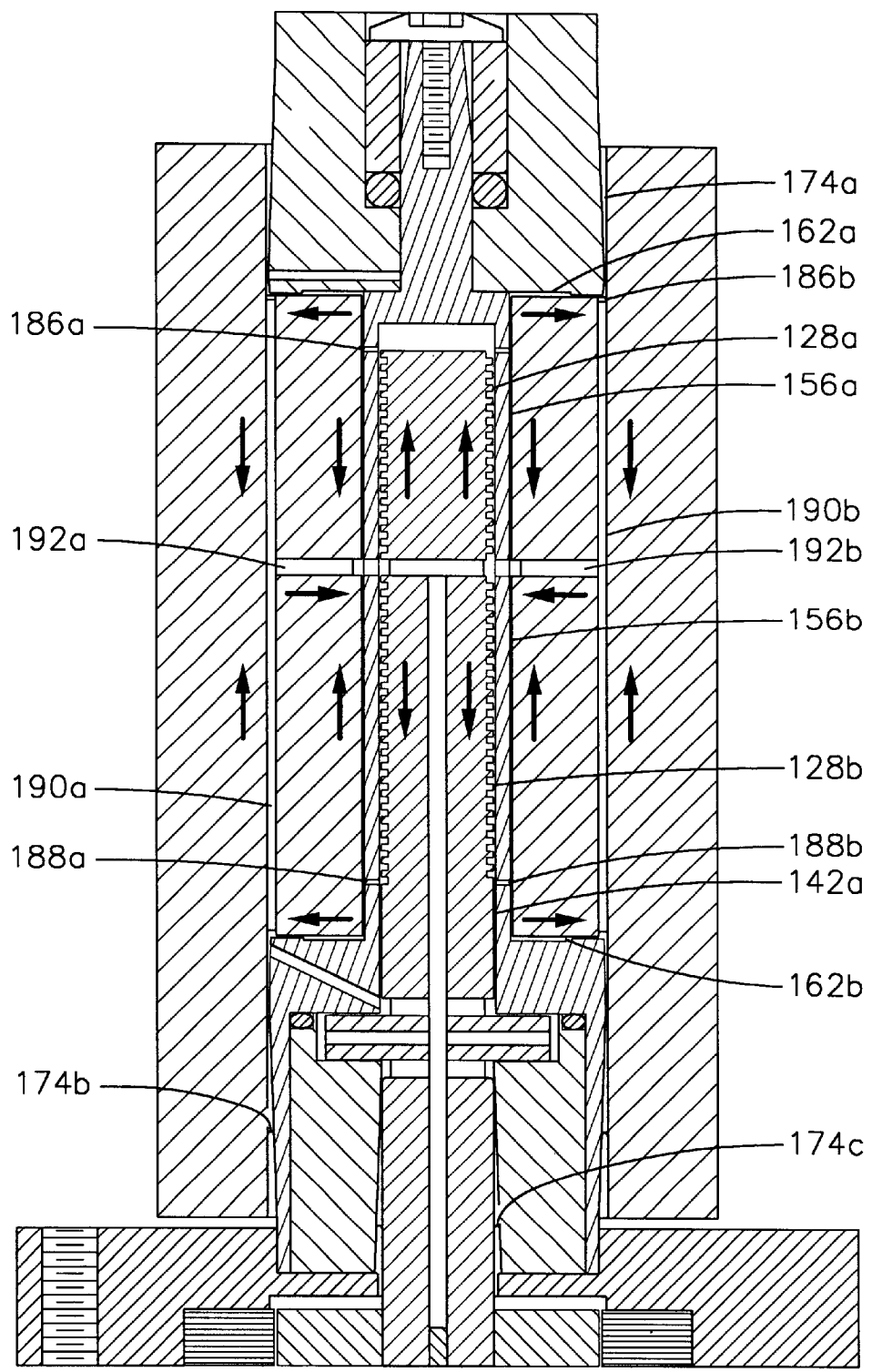
FIG. 3 is a schematic view of the lubricating fluid flow in the hydrostatic bearing assembly from FIG. 1 with the pump shaft rotating at full speed.

As may be appreciated with reference to FIGS. 1–3, hydrostatic bearing assembly 100 of this invention also includes a plurality of fluid-filled passages for equalizing lubricating fluid pressure throughout the various bearing layers discussed above. Rotatable pump shaft 120 is stiffened by separating the two pump journal-bearing layers 142*a–b* and adding the circumferential undercuts 164*a–b* (FIG. 2B) in rotatable pump shaft 120 on each side of upper and lower radial surfaces 132*a–b*, which preferably incorporate surface-relief patterns (not shown) to urge radially-outward fluid flow in pump thrust-bearing layers 144*a–b*. This prevents cavitation by raising the hydrostatic pressure in the non-bearing clearance 166 (FIG. 1) at the thrust plate periphery between upper and lower radial surfaces 132*a–b*. Circumferential undercuts 164*a–b* are interconnected by pressure-equalizing fluid-filled passages in rotatable pump shaft 120, which preferably include a single axial passage 168 (FIG. 2B) interconnecting various pluralities of radial and/or oblique passages, such as the plurality (preferably four or more) of radial passages 170, only one of which is shown, and the plurality (preferably four or more) of oblique passages 172 (FIG. 2A), only one of which is shown. As can be appreciated from FIG. 1, pump journal-bearing layers 142*a–b*, pump thrust-bearing layers 144*a–b*, sleeve journal-bearing layers 156*a–b*, and sleeve thrust-bearing layers 162*a–b* are thus disposed to form a continuous pressure-controlled fluid film sealed by diverging tapered surface-tension seals formed in tapered clearances between shaft and sleeve at the three fluid capillary seals 174*a–c*, thereby eliminating the usual sources of air-bubble entrapment. This control of air-bubble entrapment and cavitation eliminates both as sources of surface-tension seal leakage and blowout. Preferably, a barrier film coating is disposed adjacent the tapered surfaces of each of fluid capillary seals 174*a–c* for discouraging surface wetting by the lubricating fluid, thereby minimizing fluid loss through surface adhesion effects.

Referring to FIG. 1, after fabrication of the elements discussed above with reference to FIGS. 2A–E, hydrostatic bearing assembly 110 can be assembled by inserting rotatable pump shaft 120 into fixed shaft 112 and fastening lower fixed-shaft insert 140 in place with the sealing O-ring 176 substantially as shown. This subassembly may then be fastened to mounting flange 104 before fastening permanent magnet element 108 onto rotatable pump shaft 120 substantially as shown. Rotatable bearing sleeve 146 may then be slipped over this subassembly and retained by slipping upper fixed shaft cap 160 over the top of rotatable pump shaft 120 before slipping the upper sealing O-ring 178 and the spacer 180 into position and fastening them to rotatable pump shaft 120 with the cap screw 182 substantially as shown. A quantity of lubricating fluid is then introduced into the lower end of axial passage 168 (FIG. 2B) and retained by inserting the fluid retaining plug 184 into the lower end of rotatable pump shaft 120 as shown.

Because rotatable bearing sleeve 146 is supported hydrostatically, sleeve journal-bearing layers 156*a–b* and sleeve thrust-bearing layers 162*a–b* preferably differ from the respective pump journal-bearing layers 142*a–b* and pump thrust-bearing layers 144*a–b* for the hydrodynamically-supported rotatable pump shaft 120. For instance, surface-relief patterns are not needed to urge radially-outward fluid flow in sleeve thrust-bearing layers 162*a–b* because such outward fluid-flow occurs as a result of the hydrostatic pressure created in fluid-pumping layers 128*a–b*, as is now described.

FIG. 3 is a schematic view of the lubricating fluid flow in bearing assembly 100 from FIG. 1 with pump shaft 120 rotating at full speed. Upper fluid-pumping layer 128*a* forces lubricating fluid upward toward a plurality (preferably eight or more) of radially-spaced orifices 186*a–b* (FIGS. 2A and 3), only two of which are shown. Similarly, lower fluid-pumping layer 128*b* forces lubricating fluid downward toward another plurality (preferably eight or more) of radially-spaced orifices 188*a–b* (FIGS. 2A and 3), only two of which are shown. Fluid-pumping layers 128*a–b* operate by means of the powerful hydrodynamic forces created between the rapidly-rotating upper and lower helical-groove pumping surfaces 124*a–b* in close proximity to the smooth inner fixed-shaft surface 118. In a preferred embodiment of this invention, the lubricating fluid pressure at orifices 186*a–b* and orifices 188*a–b* is on the order of 15 atmospheres (gauge). As seen in FIG. 3, the lubricating fluid flows out and away from orifices 186*a–b* and orifices 188*a–b* into upper and lower sleeve journal-bearing layers 156a–b, respectively. A portion of the lubricating fluid flows from sleeve journal-bearing layers 156a–b into sleeve thrust-bearing layers 162a–b, respectively, where it flows radially outward until emptying into a plurality (preferably eight or more) of axial passages 190a–b (FIG. 2D and 3), only two of which are shown. From the ends of axial passages 190a–b, the lubricating fluid flows toward the middle , emptying into a plurality (preferably eight or more) of radial passages 192a–b (FIGS. 2D and 3), only two of which are shown. Radial passages 192a–b all empty back into the undercut 194 (FIG. 2B) in rotatable pump shaft 120, from whence the lubricating fluid is returned back into fluid-pumping layer 128a–b to begin the cycle again. From this description, it can be readily appreciated that whenever pump shaft 120 is rotating at full speed, the lubricating fluid is continuously recirculated under high pressure through both sleeve journal-bearing layers 156a–b and both sleeve thrust-bearing layers 162a–b so that rotatable bearing sleeve 146 is provided with stiff and nearly frictionless support at all times, even when motionless.

The exact dispositions of the surface-tension seal menisci at each of the three fluid capillary seals 174a–c depend on the degree of taper in the respective tapered clearances 174a–c and on the "wetting" characteristics of the shaft and sleeve surfaces that form tapered clearances 174a–c The axial surface-tension forces forming fluid capillary seals 174a–c depend on the length of the wetted perimeter of the liquid-gas interface, the lubricating fluid surface-tension, the taper angle and the contact angle. The axial positioning of menisci 174a–c varies with the internal hydrodynamic/hydrostatic pressure arising from pivot bearing operation, first moving at startup and then stabilizing when the surface-tension forces and the internal lubricating fluid pressure forces balance. During operation, localized reductions in hydrodynamic pressure can lead to cavitation and/or gas bubble entrapment, which may rapidly increase the effective lubricating fluid volume. Sudden large increases in effective lubricating fluid volume may blow-out the fluid capillary seals and deplete the supply of lubricating fluid. The preferred embodiment of this invention eliminates such sources of surface-tension seal failure by using an opposing thrust bearing patterning scheme in pump thrust-bearing layers 144a–b and by controlling hydrodynamic pressure throughout the interconnected plurality fluid-filled clearances, as discussed above. The actual fluid pressure distribution of the preferred embodiment of this invention within the various lubricating fluid bearing layers is described below with reference to FIGS. 4–8.

It has been found lubricating fluid migration from menisci 174a–c can be prevented by applying a barrier-film coating on the surfaces adjacent (external and perpendicular to but not on the actual tapers) each pair of surfaces forming tapered clearances 174a–c. To obtain the desired "stiffness" in the capillary seals, the high surface energy of the tapered metal surfaces is preserved by preventing any contamination of the actual tapers with the lower-energy barrier-film coating. A coating of NYEBAR (a trademark of William F. Nye Corp, supra) prevents wetting of the adjacent surfaces by the lubricating fluid, thereby increasing the meniscus contact angles sufficiently to eliminate fluid migration. On a normal uncoated metal surface, a lubricating oil migrates along the surface by wetting to create a meniscus angle of about zero degrees. Using a NYEBAR barrier-film coating increases the meniscus contact angle to about 75 degrees, thereby eliminating most migration and spontaneous surface wetting in the regions of fluid capillary seals 174a–c.

Figure 4:
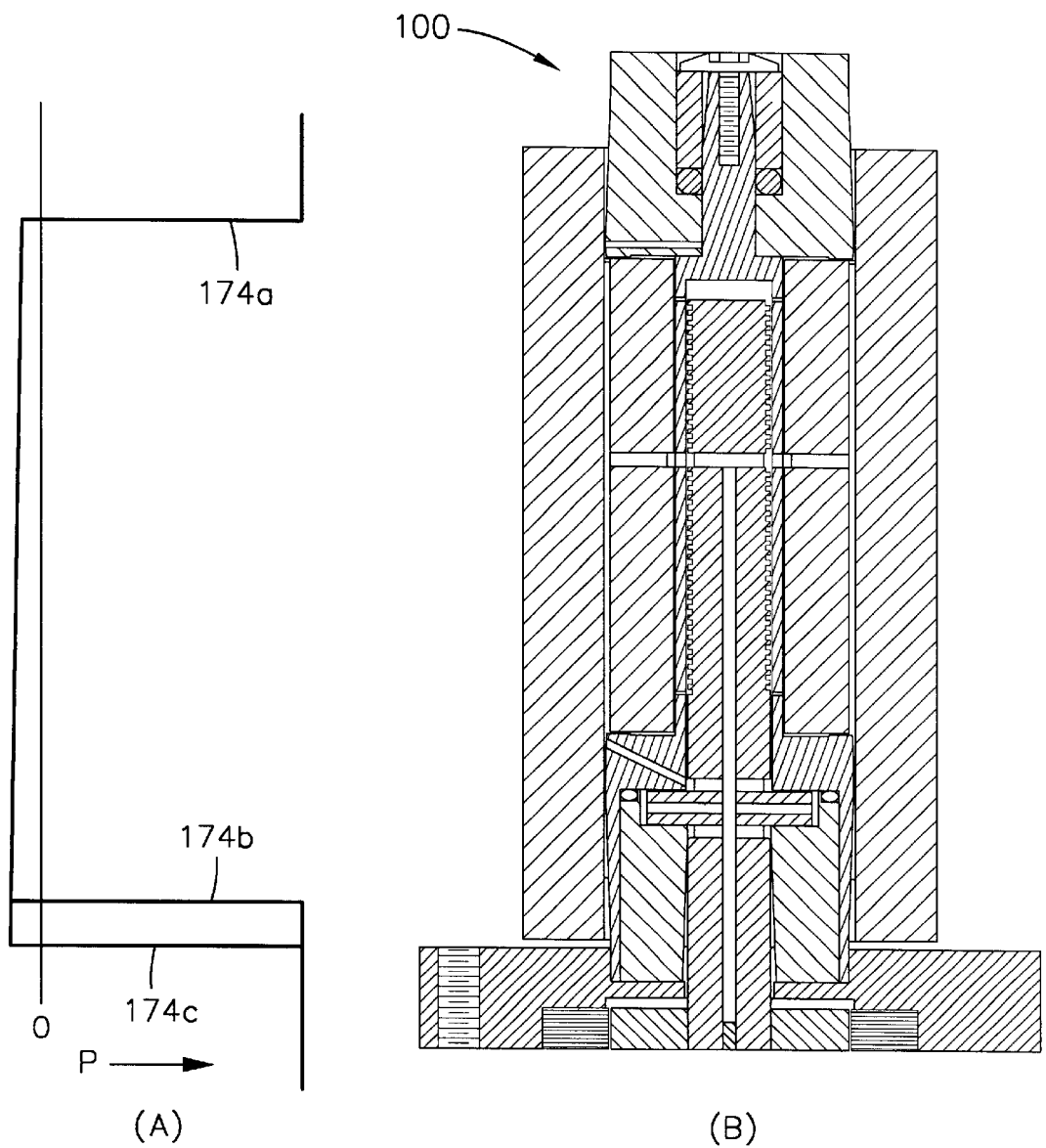
FIG. 4 illustrates the axial fluid pressure distribution within the fluid-filled passages and the fluid capillary seals of the hydrostatic bearing assembly from FIG. 1 with the pump shaft motionless.

The chart (A) in FIG. 4 illustrates the axial fluid pressure distribution within fluid capillary seals 1 74a–c and the various fluid-filled passages of hydrostatic bearing assembly 100 of FIG. 1 with rotatable pump shaft 120 held motionless. The chart (A) in FIG. 4 is aligned to correspond axially with a representation (B) of hydrostatic bearing assembly 100 and shows the fluid pressure rising slightly toward the lower end of assembly 100 because of hydrostatic column effects. FIG. 4 also shows that the pressure across fluid capillary seals 174a–c drops from about one atm gage on the gas side to perhaps −0.1 atm gage on the fluid side of the meniscus.

Figure 5:
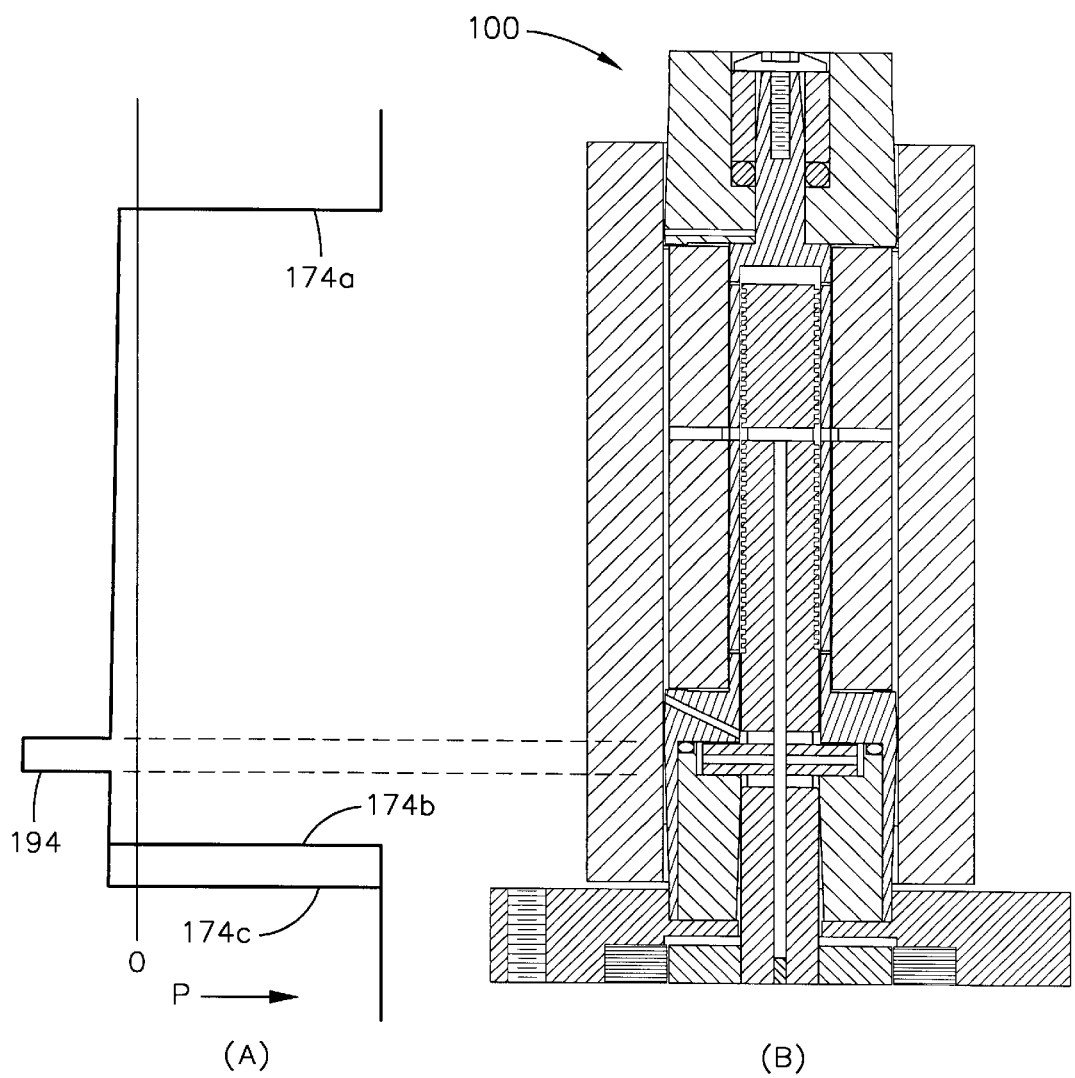
FIG. 5 illustrates the axial fluid pressure distribution within the fluid-filled passages and the fluid capillary seals of the hydrostatic bearing assembly from FIG. 1 with the pump shaft rotating at full speed.

FIG. 5 illustrates the axial fluid pressure distribution within fluid capillary seals 174a–c and the various fluid-filled passages of hydrostatic bearing assembly 100 of FIG. 1 with rotatable pump shaft 120 rotating at full speed. The chart (A) in FIG. 5 is aligned to correspond axially with a representation (B) of hydrostatic bearing assembly 100 and shows the axial pressure distribution to be substantially unchanged from that for a stationary pump shaft 120 (FIG. 4) except for a centrifugal drop 194 arising from the centrifugal forces created in the lubricating fluid at the rapidly-spinning plurality of radial passages 170 (FIG. 2B) in rotatable pump shaft 120. Orifice and rotational velocity design parameters are selected to control centrifugal drop 194 to avoid cavitation.

Figure 6:
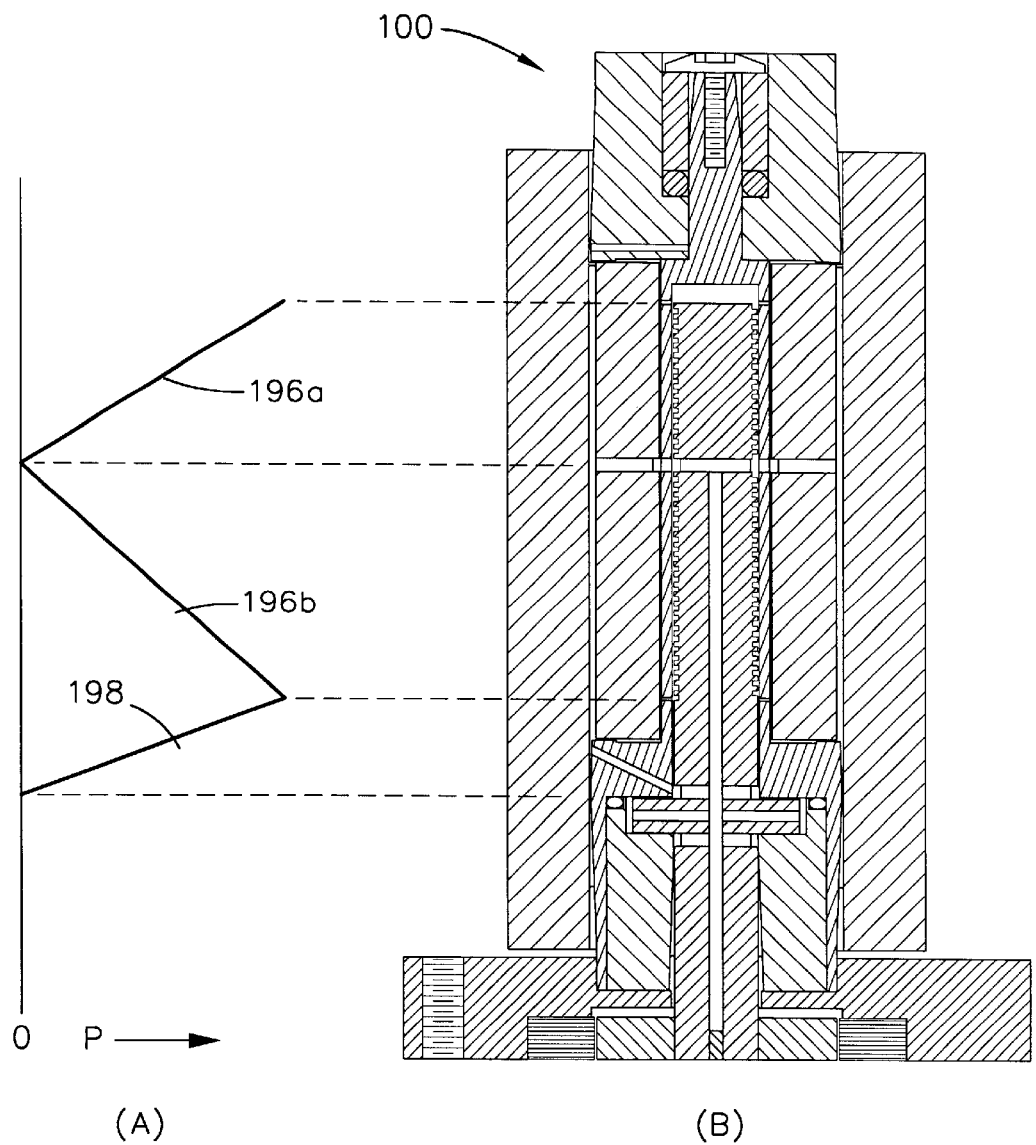
FIG. 6 illustrates the axial fluid pressure distribution within the fluid-pumping layer of the hydrostatic bearing assembly from FIG. 1 with the pump shaft rotating at full speed.

FIG. 6 illustrates the axial fluid pressure distribution within fluid-pumping layers 128a–b of hydrostatic bearing assembly 100 from FIG. 1 with rotatable pump shaft 120 rotating at full speed. The chart (A) in FIG. 6 is aligned to correspond axially with a representation (B) of hydrostatic bearing assembly 100 in FIG. 6 and the line 196a shows that the hydrodynamic fluid pressure in fluid pumping layer 128a varies from about 15 atm gage (for the preferred pump and orifice design parameters) at orifice 186a (FIG. 3) at the top to zero atm gage at radial passage 192a (FIG. 3) at the bottom. Similarly, the line 196b shows that the hydrodynamic fluid pressure in fluid pumping layer 128b varies from about zero atm gage at radial passage 192a (FIG. 3) at the top to about 15 atm gage at orifice 188a (FIG. 3) at the bottom. Finally, the line 198 shows that the hydrodynamic fluid pressure in pump journal-bearing layers 142a (FIG. 3) varies from about 15 atm gage at orifice 188a (FIG. 3) at the top to zero atm gage at circumferential undercut 164a (FIG. 2B) at the bottom.

Figure 7:
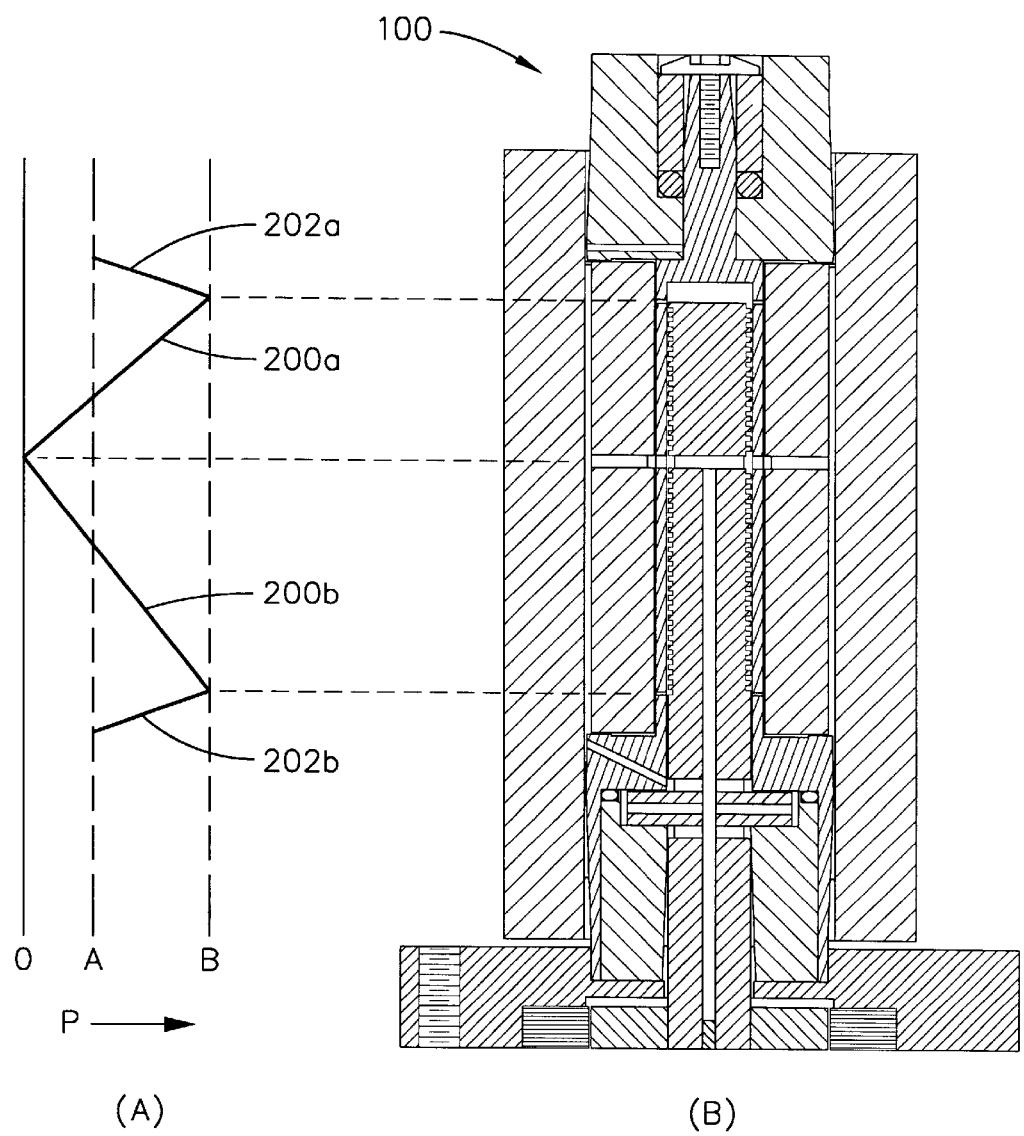
FIG. 7 illustrates the axial fluid pressure distribution within the sleeve journal-bearing layer of the hydrostatic bearing assembly from FIG. 1 with the pump shaft rotating at full speed.

FIG. 7 illustrates the axial fluid pressure distribution within upper and lower sleeve journal-bearing layers 156a–b of hydrostatic bearing assembly 100 from FIG. 1 with the pump shaft rotating at full speed. The chart (A) in FIG. 7 is aligned to correspond axially with a representation (B) of hydrostatic bearing assembly 100 in FIG. 7 and the line 200a shows that the hydrodynamic fluid pressure in upper sleeve journal-bearing layer 156a varies from PB atm gage (about half of the nominal 15 atm gage pump output pressure discussed above for the preferred pump and orifice design parameters) at orifice 186a (FIG. 3) near the top to zero atm gage at radial passage 192a (FIG. 3) at the bottom. Similarly, the line 200b shows that the hydrodynamic fluid pressure in lower sleeve journal-bearing layer 156b varies from about zero atm gage at radial passage 192a (FIG. 3) at the top to PB atm gage at orifice 188a (FIG. 3) near the bottom. The line 202a shows that the hydrodynamic fluid pressure in upper sleeve journal-bearing layer 156a varies from PB atm gage at orifice 186a (FIG. 3) near the top to $P_A<P_B$ atm gage at the top where upper sleeve journal-bearing layer 156a joins upper sleeve thrust bearing layer 162a (FIG. 3). Similarly, the line 202b shows that the hydrodynamic fluid pressure in lower sleeve journal-bearing layer 156b varies from $P_B$ atm gage at orifice 188a (FIG. 3) near the bottom to $P_A<P_B$ atm gage at the bottom where lower sleeve journal-bearing layer 156b joins lower sleeve thrust bearing layer 162b (FIG. 3). The values and ratios of the nominal pump output, $P_A$ and $P_B$ pressures are determined by the pump, orifice, thrust bearing surface pattern and equalization port design parameters, which should be selected to provide acceptable circulation of the lubricating fluid without cavitation.

Figure 8:
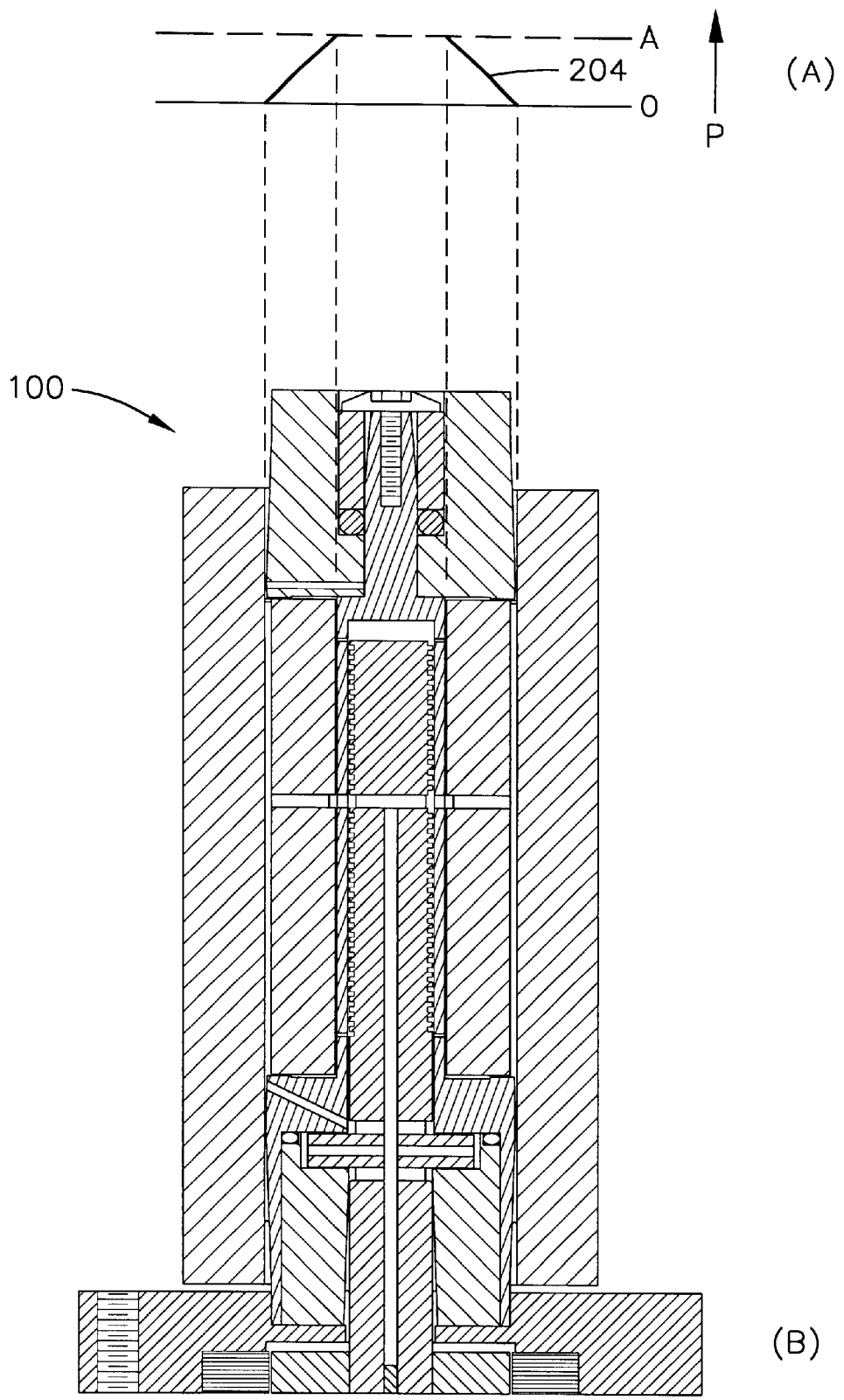
FIG. 8 illustrates the radial fluid pressure distribution within the sleeve thrust-bearing layer of the hydrostatic bearing assembly from FIG. 1 with the pump shaft rotating at full speed.

FIG. 8 illustrates the radial fluid pressure distribution within upper and lower sleeve thrust-bearing layers 156a–b of hydrostatic bearing assembly 100 from FIG. 1 with the pump shaft rotating at full speed. The chart (A) in FIG. 8 is aligned to correspond radially with a representation (B) of hydrostatic bearing assembly 100 in FIG. 8B and the line 204 shows that the hydrodynamic fluid pressure in both upper and lower sleeve thrust-bearing layers 162a–b varies from $P_A$ atm gage where the sleeve thrust-bearing layers 162a–b meet the respective sleeve-journal-bearing layers 156b at the inside radius to nearly zero atm gage at the outside radius.

The hydrodynamic equations and design trade-offs that determine the pump and thrust bearing groove parameters are well known in the art and discussed in references such as William A. Gross et al., *Fluid Film Lubrication*, New York, John Wiley and Sons, 1980. The hydrostatic equations that determine the compensating orifice parameters and hydrostatic clearance space parameters are well-known to those of ordinary skill in the art and may be found in many references. Many modifications and adaptations of the described parameters may occur to one skilled in the art without departing from the scope of this invention.

Figure 9:
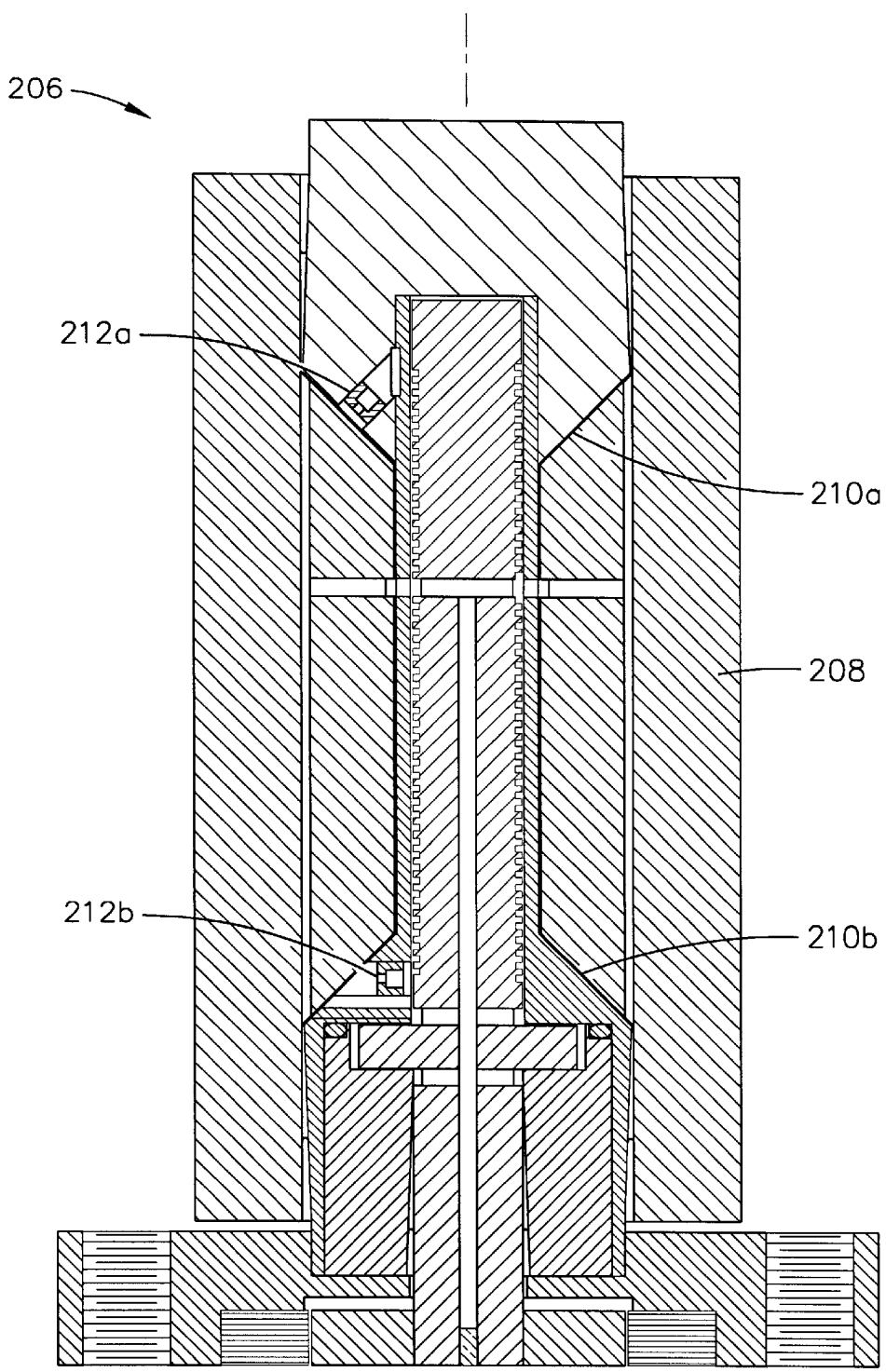
FIG. 9 shows a cross-sectional view of an alternative embodiment of the hydrostatic bearing assembly of this invention wherein each of the sleeve thrust-bearing layers is configured as a substantially annular layer on a conical surface.

FIG. 9 shows a cross-sectional view of an alternative embodiment 206 of the hydrostatic bearing assembly of this invention. Hydrostatic bearing assembly 206 includes a rotatable bearing sleeve 208 with the upper and lower sleeve thrust-bearing layers 210a–b configured as substantially annular layers on a conical surface instead of the substantially flat annular layers 162a–b discussed above. Although convex conical surfaces 210a–b are illustrated in FIG. 9, concave conical surfaces may also be used but are not preferred because of assembly disadvantages. A plurality of radially-spaced orifices exemplified by orifices 212a–b are disposed substantially as shown to replace the functionality of the plurality of radially-spaced orifices exemplified by orifices 186a–b (FIG. 3). Because orifices 212a–b are disposed within sleeve thrust-bearing layers 210a–b, the hydrodynamic pressure distribution in the several lubricating fluid layers may differ somewhat from those discussed above in connection with hydrostatic bearing assembly 100 of FIG. 1. The remaining elements of hydrostatic bearing assembly 206 operate substantially as described above for the analogous elements of hydrostatic bearing assembly 100 (FIGS. 1–8).

Figure 10:
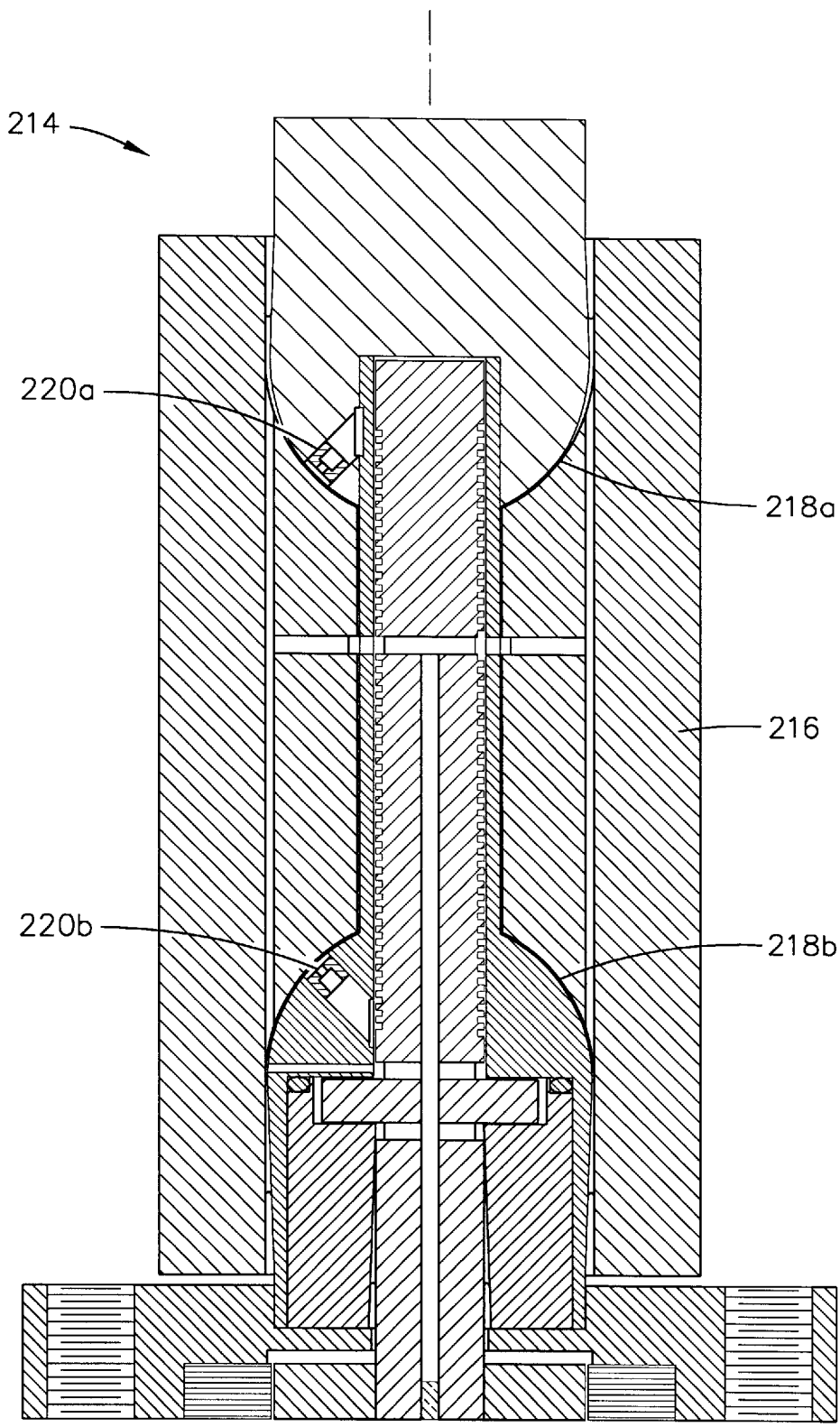
FIG. 10 shows a cross-sectional view of an alternative embodiment of the hydrostatic bearing assembly of this invention wherein each of the sleeve thrust-bearing layers is configured as a substantially annular layer on a spherical surface.

FIG. 10 shows a cross-sectional view of an alternative embodiment 214 of the hydrostatic bearing assembly of this invention that may be more tolerant of misalignments. Hydrostatic bearing assembly 214 includes a rotatable bearing sleeve 216 with the upper and lower sleeve thrust-bearing layers 218a–b configured as substantially annular layers on a spherical surface instead of the substantially flat annular layers 162a–b discussed above. Although convex spherical surfaces 218a–b are illustrated in FIG. 10, concave spherical surfaces may also be used. A plurality of radially-spaced orifices exemplified by orifices 220a–b are disposed substantially as shown to replace the functionality of the plurality of radially-spaced orifices exemplified by orifices 186a–b (FIG. 3). Because orifices 220a–b are disposed within sleeve thrust-bearing layers 218a–b, the hydrodynamic pressure distribution in the several lubricating fluid layers may differ somewhat from those discussed above in connection with hydrostatic bearing assembly 100 of FIG. 1. The remaining elements of hydrostatic bearing assembly 214 operate substantially as described above for the analogous elements of hydrostatic bearing assembly 100 (FIGS. 1–8).

Figure 11:
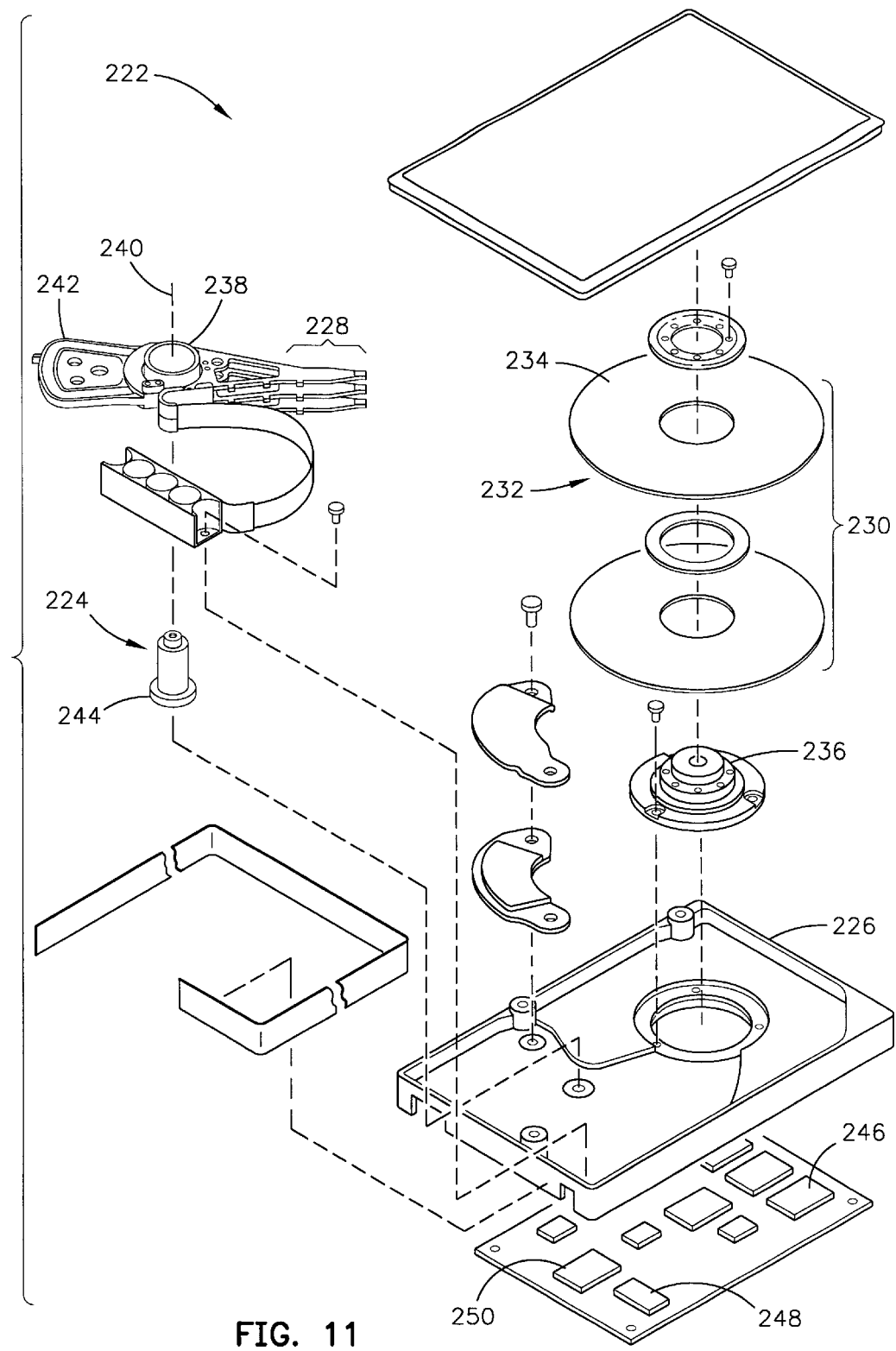
FIG. 11 shows an exploded perspective view of a disk drive apparatus including the hydrostatic pivot bearing assembly of this invention.

FIG. 11 shows an exploded perspective view of a disk drive apparatus 222 including the hydrostatic pivot bearing assembly 224 of this invention. Disk drive apparatus 222 includes a base 226, a head stack assembly 228, a disk assembly 230 having a rotatable data storage disk 232 with a surface 234 adapted for the storage of data, and a disk transport mechanism including a spindle motor 236 for selectively imparting rotational motion to data storage disk 232. Spindle motor 236 is fixed to base 226 may impart a mechanical vibration thereto during operation. Head stack assembly 228 is fixed to an actuator assembly 238 mounted on hydrostatic pivot bearing assembly 224, which is fixed to base 226 so that actuator assembly 238 can be rotated about a pivot axis 240 by means of the actuator motor 242. Hydrostatic pivot bearing assembly 224 is fixed to base 226 and includes a pivot bearing motor 244 that may impart a mechanical vibration to base 226 during operation. The operation, timing and synchronicity of spindle motor 236, actuator motor 242 and pivot bearing motor 244 are controlled by a motor controller 246, which supplies the necessary drive signals. Motor controller 246 includes circuit means 248 for controlling the speed and phase of rotation of spindle motor 236 and the speed and phase of rotation of pivot bearing motor 244. Motor controller 246 also includes regulation means 250 for regulating the rotational speed and phase of pivot bearing motor 244 with respect to the rotational speed and phase of spindle motor 236 to permit cancellation of the mechanical vibrations arising from spindle motor 236 and pivot bearing motor 244. Motor controller 246 is now described in more detail.

Figure 12:
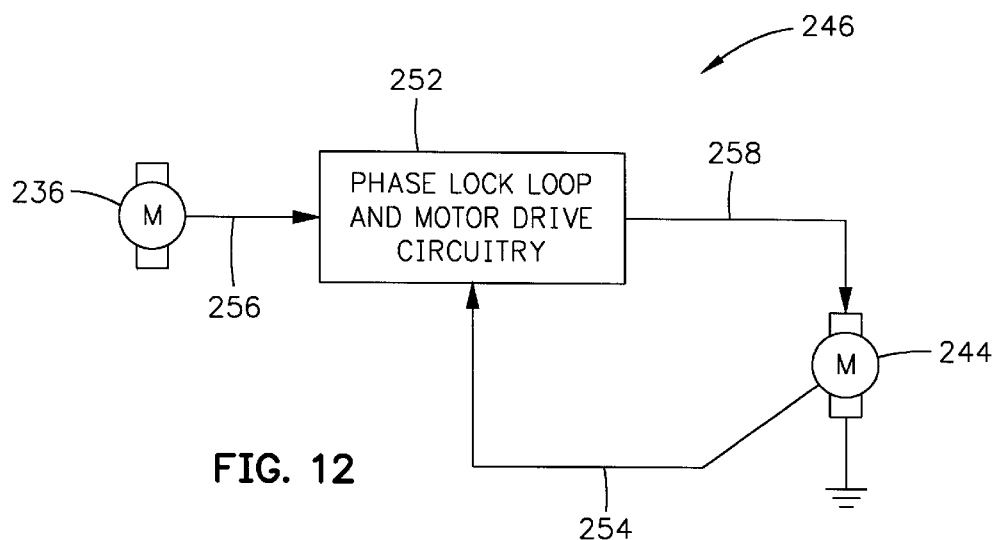
FIG. 12 shows a functional block-diagram of an illustrative embodiment of a spindle and pivot-pump motor controller suitable for use with the disk-drive apparatus from FIG. 11.

FIG. 12 shows a functional block-diagram of an illustrative embodiment of motor controller 246 suitable for use with disk-drive apparatus 222 (FIG. 11). In FIG. 12, the motor controller circuitry 252 accepts a rotational feedback signal 254 from pivot bearing motor 244 and a rotational reference signal 256 from spindle motor 236. Motor controller circuitry 252 combines signals 254 and 256 to develop a power drive signal 258, which is transmitted to pivot bearing motor 244. By adjusting drive signal 258, motor controller circuitry 252 can eventually eliminate all differences between signals 254 and 256, thereby synchronizing pivot bearing motor 244 and spindle motor 236, which can be calibrated to cancel or at least minimize the aggregated mechanical vibrations arising from pivot bearing motor 244 and spindle motor 236, as can be appreciated by those of ordinary skill in the signal processing arts.

Figure 13:
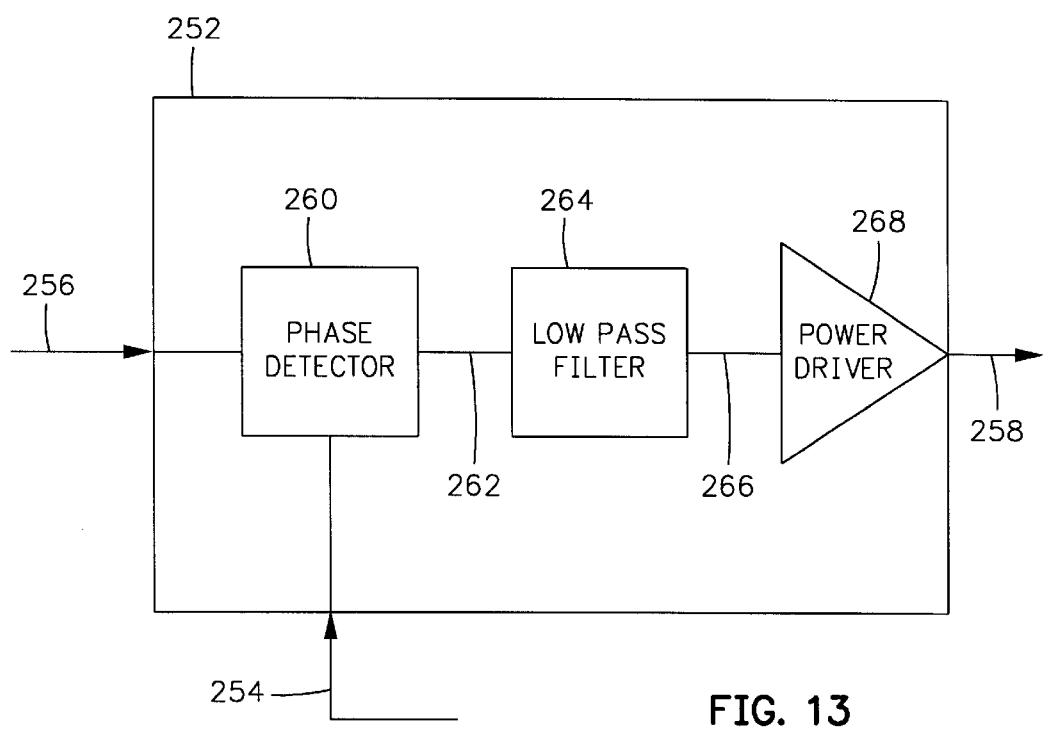
FIG. 13 shows a functional block-diagram of an illustrative embodiment of a phase lock loop and power driver circuit suitable for use in the controller from FIG. 12.

FIG. 13 shows a functional block-diagram of an illustrative embodiment of motor controller circuitry 252 (FIG. 12) where a phase detector 260 accepts rotational feedback signal 254 from pivot bearing motor 244 and a rotational reference signal 256 from spindle motor 236 and produces a phase signal 262 representing the phase difference between rotational feedback signal 254 and rotational reference signal 256. The low-pass filter 264 accepts phase signal 262 and filters it to extract the low-frequency components 266. Low-frequency components 266 are amplified by a power driver 268 to produce power drive signal 258 discussed above. As is well-known in the electronic arts, the embodiment shown in FIG. 13 operates to minimize the phase differences between rotational feedback signal 254 and a rotational reference signal 256.

Figure 14:
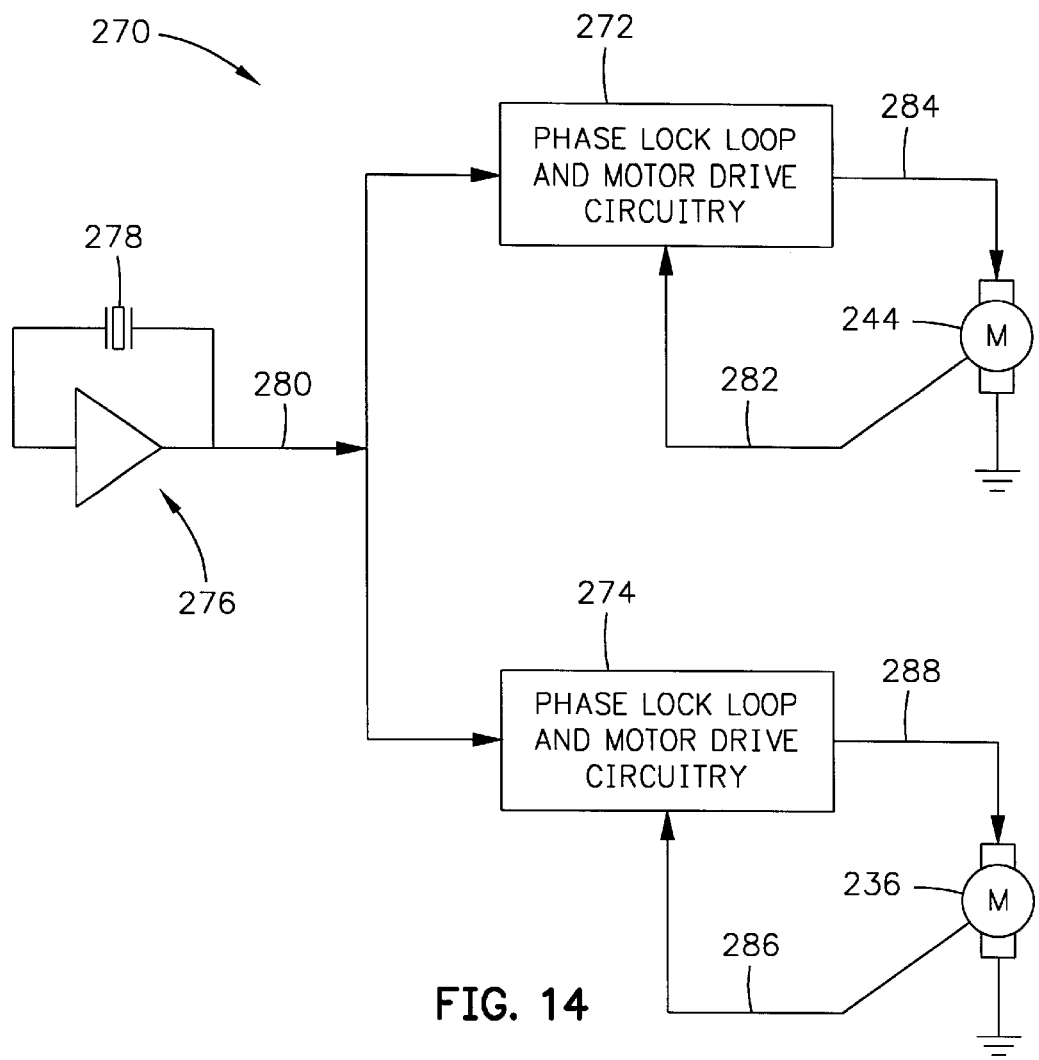
FIG. 14 shows a functional block-diagram of an alternative embodiment of a spindle and pivot-pump motor controller suitable for use with the disk-drive apparatus from FIG. 11.

FIG. 14 shows a functional block-diagram of an alternative embodiment 270 of a motor controller suitable for use with disk-drive apparatus 222 (FIG. 11). Two motor controller circuits 272 and 274 are provided to independently synchronize spindle motor 236 and pivot bearing motor 244 to a reference oscillator 276, which is shown as including a crystal timing reference 278. The reference oscillator signal 280 is accepted by both motor controller circuits 272 and 274. Motor controller circuit 272 accepts the rotational feedback signal 282 from pivot bearing motor 244 and produces the power drive signal 284 for pivot bearing motor 244, thereby synchronizing the rotation of (and the mechanical vibration from) pivot bearing motor 244 to reference oscillator 276. Similarly, motor controller circuit 274 accepts the rotational feedback signal 286 from spindle motor 236 and produces the power drive signal 288 for spindle motor 236, thereby synchronizing the rotation of (and the mechanical vibration from) spindle motor 236 to reference oscillator 276. Many other motor controller circuit means for accomplishing this objective may occur to those of ordinary skill in the art without departing from the scope of this invention.

Figure 15:
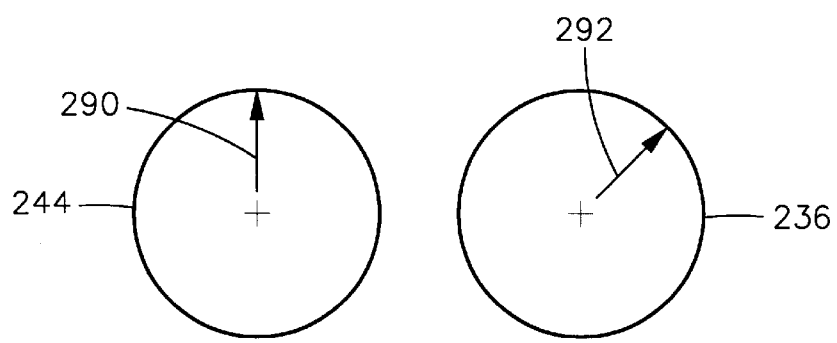
FIG. 15 is a schematic diagram useful for illustrating the relationship between spindle and pivot-pump vibration force vectors.

FIG. 15 is a schematic diagram illustrating the relationship between the mechanical vibration force vectors arising from spindle motor 236 and pivot bearing motor 244. In the illustration, the net force vector 290 arising from the rotation of pivot bearing motor 244 is oriented in a direction different from the net force vector 292 arising from spindle motor 236 (and may have a different amplitude as well). Motor controller 246 (FIG. 12) of this invention operates to synchronize the rotation and phase of pivot bearing motor 244 and spindle motor 236 as needed to minimize the aggregate mechanical vibration arising from both; that is, to minimize the vector sum of net force vectors 290 and 292 (FIG. 15). In disk drive apparatus 222, the hydrostatic pivot bearing assembly of this invention makes this net force vector cancellation possible for the first time.

Figure 16A:
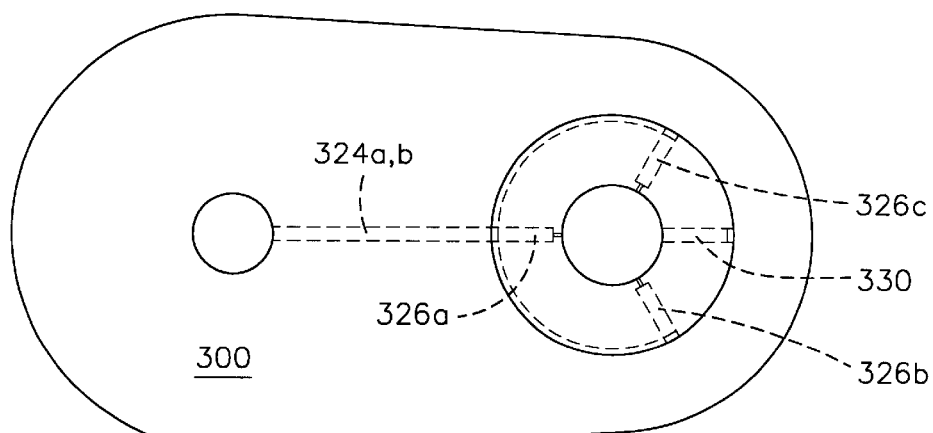
FIGS. 16A–16B show a top view and a cross-sectional front view of an alternative embodiment of the hydrostatic bearing assembly of this invention wherein the pumping and bearing elements are offset from one another.
Figure 16B:
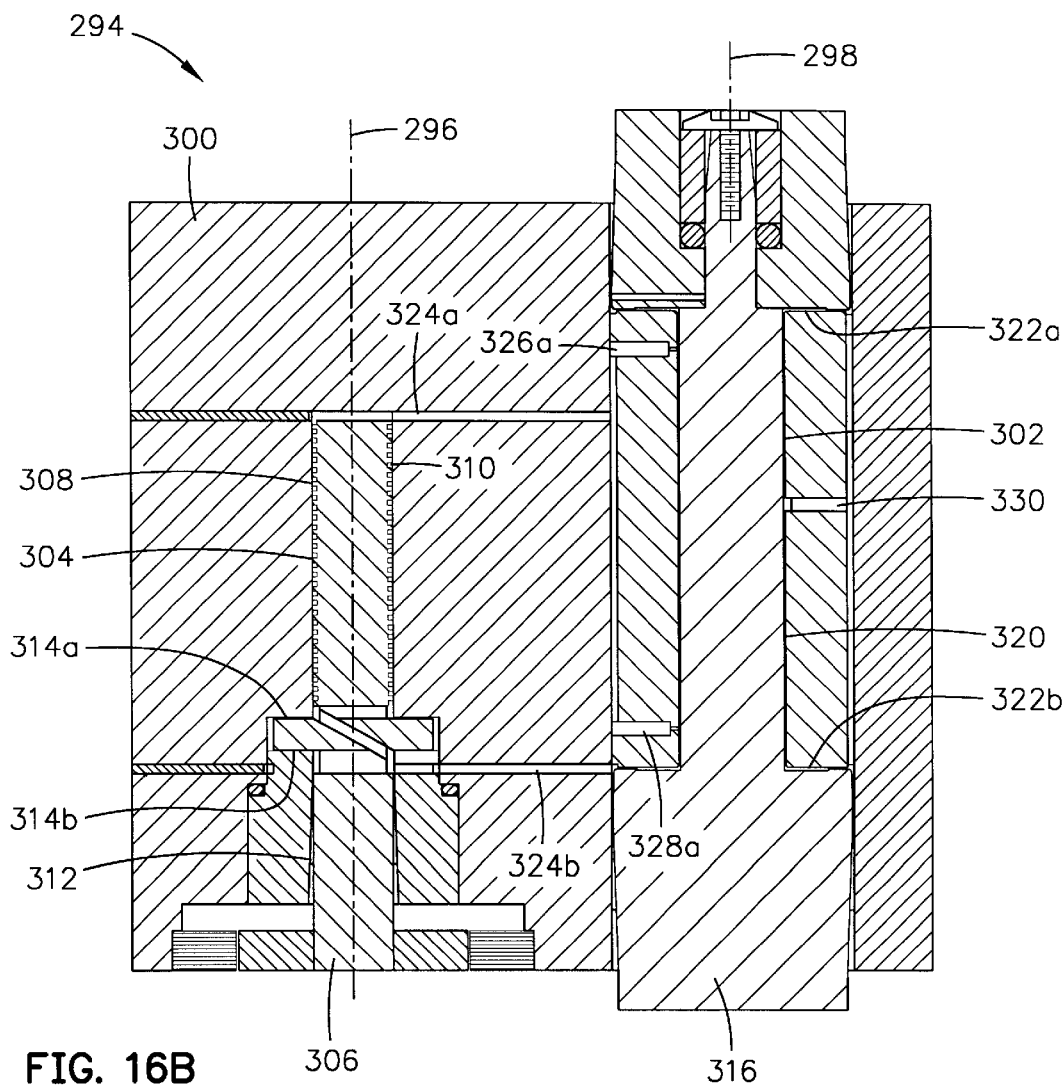

FIGS. 16A–16B show two cross-sectional views of an alternative embodiment 294 of the hydrostatic bearing assembly of this invention wherein the pumping axis 296 is offset from the bearing axis 298. The elements making up hydrostatic bearing assembly 294 are housed in a fixed member 300, which includes an inner fixed-member bearing surface 302 centered around bearing axis 298 and an inner fixed-member pumping surface 304 centered around pumping axis 296. A rotatable pump shaft 306 is disposed inside inner fixed-member pumping surface 304. Rotatable pump shaft 306 has an outer pump-shaft surface with one region serving as a pump-shaft pumping surface 308, which is disposed with respect to inner fixed-member pumping surface 304 so as to define a fluid pumping layer 310 therebetween, and another region serving as a pump-shaft bearing surface, which defines a pump journal-bearing layer 312 and two pump thrust-bearing layers 314a–b substantially as shown. A rotatable bearing shaft 316 is disposed within inner fixed-member bearing surface 302 so that the outer bearing-shaft surface defines a shaft journal-bearing layer 320 and two shaft thrust-bearing layers 322a–b substantially as shown in FIG. 16B.

Fluid-pumping layer 310 forces lubricating fluid upward toward an upper fluid-filled passage 324a, from where the lubricating fluid is routed (via other passages) to a plurality (preferably three or more) of radially-spaced orifices 326a–c and 328a–c. The lubricating fluid then flows into shaft journal-bearing layer 320 under pressure and exits into the radial passage 330 from where it eventually flows back into a lower fluid-filled passage 324b and back to pump journal-bearing layer 312 and two pump thrust-bearing layers 314a–b, and then back to fluid pumping layer 310 to complete the circuit.

Clearly, in view of these teachings, other embodiments and modifications of this invention may occur readily to those of ordinary skill in the art. Therefore, the invention is to be limited only by the following claims, which comprise all such obvious embodiments and modifications, viewed in conjunction with the above specification and accompanying drawing.

What is claimed is:

1. A hydrostatic bearing assembly for supporting rotation about a bearing axis, the assembly comprising:
   a fixed shaft having outer and inner surfaces disposed about the bearing axis;
   a quantity of lubricating fluid disposed on the inner and outer fixed-shaft surfaces;
   a rotatable pump shaft having an outer surface including
      a pump-shaft pumping surface disposed within the inner fixed-shaft surface to form therebetween a fluid-pumping layer of lubricating fluid and
      a pump-shaft bearing surface disposed within the inner fixed-shaft surface to form therebetween a pump journal-bearing layer of the lubricating fluid and two pump thrust-bearing layers of the lubricating fluid;
   a rotatable bearing sleeve having an inner surface disposed about the outer fixed-shaft surface to form therebetween a sleeve journal-bearing layer of the lubricating fluid and two sleeve thrust-bearing layers of the lubricating fluid;
   a plurality of fluid-filled passages within each of the fixed shaft, the pump shaft and the bearing sleeve to communicate fluid pressure between the fluid-pumping layer and the plurality of pump and sleeve journal-bearing and thrust-bearing layers; and
   a tapered surface to form a fluid capillary seal at each of two ends of the bearing sleeve and at one end of the pump shaft for retaining the lubricating fluid within the bearing assembly.

2. The hydrostatic bearing assembly of claim 1 wherein a surface on at least one side of each of the pump thrust-bearing layers has a surface-relief pattern disposed to increase hydrodynamic pressure therein responsive to rotation of the rotatable pump shaft with respect to the fixed shaft.

3. The hydrostatic bearing assembly of claim 1 further comprising:
   a barrier film coating disposed adjacent the tapered surfaces of each of the fluid capillary seals for discouraging surface wetting by the lubricating fluid.

4. The hydrostatic bearing assembly of claim 1 wherein each of the pump thrust-bearing layers is disposed adjacent a circumferential undercut in the outer surface of the rotatable pump shaft.

5. The hydrostatic bearing assembly of claim 1 wherein, within each of the pump thrust-bearing layers and each of the sleeve thrust-bearing layers, the lubricating fluid forms a substantially annulate thrust-bearing layer disposed on a portion of a geometrical surface selected from a group consisting of:
   a plane;
   a cone; and
   a sphere.

6. A hydrostatic bearing assembly for supporting rotation about a bearing axis, the assembly comprising:

a fixed member having an inner bearing surface disposed about the bearing axis and an inner pumping surface disposed about a pumping axis;

a quantity of lubricating fluid disposed on the inner fixed-member bearing and pumping surfaces;

a rotatable pump shaft having an outer surface disposed about the pumping axis including
   a pumping surface disposed within the inner fixed-member pumping surface to form therebetween a fluid-pumping layer of the lubricating fluid and
   a bearing surface disposed within the inner fixed-member pumping surface to form therebetween a pump journal-bearing layer of the lubricating fluid and two pump thrust-bearing layers of the lubricating fluid;

a rotatable bearing shaft having an outer surface disposed about the bearing axis within the inner fixed-member bearing surface to form therebetween a shaft journal-bearing layer of the lubricating fluid and two shaft thrust-bearing layers of the lubricating fluid;

a plurality of fluid-filled passages within each of the fixed member and the pump shaft to communicate fluid pressure between the fluid-pumping layer and the plurality of pump and shaft journal-bearing and thrust-bearing layers; and a tapered surface to form a fluid capillary seal at each of two ends of the bearing shaft and at one end of the pump shaft for retaining the lubricating fluid within the bearing assembly.

7. The hydrostatic bearing assembly of claim 6 wherein a surface on at least one side of each of the pump thrust-bearing layers has a surface-relief pattern disposed to increase hydrodynamic pressure therein responsive to rotation of the pump shaft with respect to the fixed member.

8. The hydrostatic bearing assembly of claim 6 further comprising:
   a barrier film coating disposed adjacent the tapered surfaces of each of the fluid capillary seals for discouraging surface wetting by the lubricating fluid.

9. A hydrostatic pivot bearing assembly for use in a disk drive having a base and a head stack assembly, the pivot bearing assembly for rotatably coupling the head stack assembly to the base about a bearing axis, the pivot bearing assembly comprising:
   a fixed shaft having outer and inner surfaces disposed about the bearing axis;
   a quantity of lubricating fluid disposed on the inner and outer fixed-shaft surfaces;
   a rotatable pump shaft having an outer surface including
      a pump-shaft pumping surface disposed within the inner fixed-shaft surface to form therebetween a fluid-pumping layer of the lubricating fluid and
      a pump-shaft bearing surface disposed within the inner fixed-shaft surface to form therebetween a pump journal-bearing layer of the lubricating fluid and two pump thrust-bearing layers of the lubricating fluid;
   a rotatable bearing sleeve having an inner surface disposed about the outer fixed-shaft surface to form therebetween a sleeve journal-bearing layer of the lubricating fluid and two sleeve thrust-bearing layers of the lubricating fluid;
   a plurality of fluid-filled passages within each of the fixed shaft, the pump shaft and the bearing sleeve to communicate fluid pressure between the fluid-pumping layer and the plurality of pump and sleeve journal-bearing and thrust-bearing layers; and
   a tapered surface to form a fluid capillary seal at each of two ends of the bearing sleeve and at one end of the pump shaft for retaining the lubricating fluid within the bearing assembly.

10. The hydrostatic bearing assembly of claim 9 wherein a surface on at least one side of each of the pump thrust bearing layers has a surface-relief pattern disposed to increase hydrodynamic pressure in the pump thrust-bearing layer responsive to rotation of the rotatable pump shaft with respect to the fixed shaft.

11. The hydrostatic bearing assembly of claim 9 further comprising:
   a barrier film coating disposed adjacent the tapered surfaces of each of the fluid capillary seals for discouraging surface wetting by the lubricating fluid.

12. The hydrostatic bearing assembly of claim 9 wherein each of the pump thrust bearing layers is disposed at a circumferential undercut in the outer surface of the rotatable pump shaft.

13. The hydrostatic bearing assembly of claim 9 wherein, within each of the pump thrust-bearing layers and each of the sleeve thrust-bearing layers, the lubricating fluid forms a substantially annulate thrust-bearing layer disposed on a portion of one geometrical surface selected from a group consisting of:
   a plane;
   a cone; and
   a sphere.

14. A disk drive apparatus for storing data, the disk drive apparatus comprising:
   a base;
   a disk assembly having at least one rotatable data storage disk with at least one surface adapted for storage of data thereon;
   a disk transport mechanism coupled to the rotatable data storage disk and including a spindle motor for selectively imparting rotational motion to the data storage disk and for generating a first mechanical vibration in the disk drive apparatus;
   a head stack assembly for reading and writing data on the disk assembly; and
   a hydrostatic pivot bearing assembly for rotatably coupling the head stack assembly to the base about a bearing axis, the pivot bearing assembly comprising
      a fixed shaft having outer and inner surfaces disposed about the bearing axis,
      a quantity of lubricating fluid disposed on the inner and outer fixed-shaft surfaces,
      a rotatable pump shaft having an outer surface including
         a pump-shaft pumping surface disposed within the inner fixed-shaft surface to form therebetween a fluid-pumping layer of the lubricating fluid and
         a pump-shaft bearing surface disposed within the inner fixed-shaft surface to form therebetween a pump journal-bearing layer of the lubricating fluid and two pump thrust-bearing layers of the lubricating fluid,
      a rotatable bearing sleeve having an inner surface disposed about the outer fixed-shaft surface to form therebetween a sleeve journal-bearing layer of the lubricating fluid and two sleeve thrust-bearing layers of the lubricating fluid,
      a plurality of fluid-filled passages within each of the fixed shaft, the pump shaft and the bearing sleeve to communicate fluid pressure between the fluid-pumping layer and the plurality of pump and sleeve journal-bearing and thrust-bearing layers, and a tapered surface to form a fluid capillary seal at each of two ends of the bearing sleeve and at one end of the pump shaft for retaining the lubricating fluid within the bearing assembly.

15. The hydrostatic bearing assembly of claim 14 wherein a surface on at least one side of each of the pump thrust-bearing layers has a surface-relief pattern disposed to increase hydrodynamic pressure in the pump thrust-bearing layer responsive to rotation of the pump shaft with respect to the fixed shaft.

16. The hydrostatic bearing assembly of claim 14 further comprising:

a barrier film coating disposed adjacent the tapered surfaces of each of the fluid capillary seals for discouraging surface wetting by the lubricating fluid.

17. The disk drive apparatus of claim 14 further comprising:

a pivot bearing motor for rotating the pump shaft and for generating a second mechanical vibration in the disk drive apparatus; and a motor controller having circuit means for controlling the speed and phase of the spindle motor rotation and for controlling the speed and phase of the pivot bearing motor rotation.

18. The disk drive apparatus of claim 17 wherein the motor controller circuit means includes regulation means for regulating the speed and phase of the pivot bearing motor rotation with respect to the speed and phase of the spindle motor rotation, whereby at least part of the first and second mechanical vibrations are canceled.

\* \* \* \* \*